US012768824B2

(12) United States Patent
Chen et al.

(10) Patent No.: US 12,768,824 B2
(45) Date of Patent: Oct. 20, 2026

(54) METHOD FOR DETECTING UREA-FORMALDEHYDE RESIN IN MELAMINE-FORMALDEHYDE MATERIALS

(71) Applicant: GUANGZHOU QUALITY SUPERVISION AND TESTING INSTITUTE, Guangdong (CN)

(72) Inventors: Yiguang Chen, Guangdong (CN); Wenshu Zhang, Guangdong (CN); Peilin Zhang, Guangdong (CN); Guoshan He, Guangdong (CN); Xiaogang Huang, Guangdong (CN); Zerong Li, Guangdong (CN); Xiaoting Xiong, Guangdong (CN)

(73) Assignee: GUANGZHOU QUALITY SUPERVISION AND TESTING INSTITUTE, Guangdong (CN)

( * ) Notice: Subject to any disclaimer, the term of this patent is extended or adjusted under 35 U.S.C. 154(b) by 521 days.

(21) Appl. No.: 18/476,294

(22) Filed: Sep. 27, 2023

(65) Prior Publication Data

US 2024/0319150 A1 Sep. 26, 2024

Related U.S. Application Data

(63) Continuation of application No. PCT/CN2023/084755, filed on Mar. 29, 2023.

(30) Foreign Application Priority Data

Mar. 21, 2023 (CN) ......................... 202310278304.3

(51) Int. Cl.
*G01N 30/72* (2006.01)
*B01D 71/68* (2006.01)
(Continued)

(52) U.S. Cl.
CPC ......... *G01N 30/7233* (2013.01); *G01N 30/22* (2013.01); *B01D 71/68* (2013.01);
(Continued)

(58) Field of Classification Search
None
See application file for complete search history.

(56) References Cited

U.S. PATENT DOCUMENTS 10,975,237 B1 * 4/2021 Lin ......................... C08L 61/32
2009/0099323 A1 4/2009 Schroder et al.
(Continued)

FOREIGN PATENT DOCUMENTS

CN 108195986 6/2018
CN 110954640 4/2020
(Continued)

OTHER PUBLICATIONS

Liu et al., A Method For Measuring Free Melamine In Textile, 2015, CN 105004814 A, English Translation included, whole document. (Year: 2015).*

(Continued)

*Primary Examiner* — Lore R Jarrett
(74) *Attorney, Agent, or Firm* — JCIPRNET

(57) ABSTRACT

A method for detecting urea-formaldehyde resin in melamine-formaldehyde materials is provided. The method includes the following steps: washing samples to be tested with hydrochloric acid solution, placing it at 110° C.±5° C. for hydrolysis for 60 min±5 min, passing through a polyethersulfone filter membrane to obtain the test solution, and detecting the test solution through high-performance liquid chromatography-mass spectrometry.

5 Claims, 22 Drawing Sheets

(51) Int. Cl.

| | |
|---|---|
| ***G01N 30/02*** | (2006.01) |
| ***G01N 30/06*** | (2006.01) |
| ***G01N 30/14*** | (2006.01) |
| ***G01N 30/22*** | (2006.01) |
| ***G01N 30/74*** | (2006.01) |

(52) U.S. Cl.

CPC . *G01N 2030/027* (2013.01); *G01N 2030/067* (2013.01); *G01N 2030/146* (2013.01); *G01N 30/74* (2013.01)

(56) References Cited

U.S. PATENT DOCUMENTS

2014/0326672 A1* 11/2014 Zhang ..................... C02F 1/683
210/660
2018/0371200 A1* 12/2018 Torres .................... C10G 33/04

FOREIGN PATENT DOCUMENTS

CN 112461967 3/2021
CN 116381111 7/2023

OTHER PUBLICATIONS

Lixia Liu et al., "Study of Migration Rule of Hazardous Substance in Melaminoplastic Tablewares", Guangdong Chemical Industry, Dec. 31, 2017, with English abstract, pp. 51-52, vol. 44, No. 23.

Jon Draher et al., "Validation of a rapid method of analysis using ultrahigh-performance liquid chromatography—tandem mass spectrometry for nitrogen-rich adulterants in nutritional food ingredients", Journal of Chromatography A, Nov. 15, 2014, pp. 106-113, vol. 1373.

* cited by examiner

METHOD FOR DETECTING UREA-FORMALDEHYDE RESIN IN MELAMINE-FORMALDEHYDE MATERIALS

CROSS-REFERENCE TO RELATED APPLICATION

This application is a continuation of international application of PCT application serial no. PCT/CN2023/084755, filed on Mar. 29, 2023, which claims the priority benefit of China application no. 202310278304.3, filed on Mar. 21, 2023. The entirety of each of the above-mentioned patent applications is hereby incorporated by reference herein and made a part of this specification.

TECHNICAL FIELD

The present disclosure relates to the technical field of analysis technology, in particular relates to a method for detecting whether urea-formaldehyde resin is mixed in melamine-formaldehyde materials.

BACKGROUND

Melamine-formaldehyde resin (also known as melamine resin) and melamine tableware produced with it as the main raw material are widely used in households and restaurants for their advantages of portability, non-friability, high thermal deformation temperature, poor thermal conductivity, impact resistance, similar appearance to porcelain, and long service life. The main products and raw material standards involved in melamine tableware include GB/T 41001-2021 "Melamine plastic tableware", GB/T 13451 "Plastic powder melamine formaldehyde molding compounds (MF PMCs)", and so on. Melamine tableware has also been a focus of attention of market regulatory authorities and media at all levels in recent years, and unqualified products have been found from time to time.

Urea-formaldehyde resin is a resin produced by the polymerization of urea and formaldehyde, and the relevant standards include GB/T 3403-2008 "Plastic Powdered Urea-Formaldehyde and Urea/Melamine Formaldehyde Moulding Compounds (UF and UF/MF-PMCs)" series of standards. Because urea-formaldehyde resin and urea/melamine-formaldehyde products are not much different from melamine-formaldehyde resin products in appearance, while the price of urea-formaldehyde resin is far lower than that of melamine resin, some manufacturers will add urea-formaldehyde resin (or urea) into the raw materials to reduce costs, or use the "core wrapping" process, i.e. using urea-formaldehyde resin as the main material, and melamine-formaldehyde resin powder as the surface material, to produce melamine tableware. These products have poor resistance to humidity and heat, and are more likely to release harmful substances during use, becoming a threat to human health. GB 4806.6-2016 "National Food Safety Standard Plastic Resins for Food Contact" also does not include urea-formaldehyde resin as a plastic resin for food contact.

At present, the methods for identifying melamine tableware mixed with urea-formaldehyde resin mainly include infrared spectroscopy, nuclear magnetic resonance, thermogravimetry, etc. These methods have played a certain role in the identification of melamine tableware. However, these methods have poor specificity for the analysis and identification of complex mixture systems, especially when the content of target substance is low, it is difficult to make accurate judgments, and the detection limit is generally above 5%.

Therefore, it is urgent to provide a method with strong specificity and high sensitivity to identify whether urea-formaldehyde resin is mixed in melamine-formaldehyde materials.

SUMMARY OF THE DISCLOSURE

Based on the above, the purpose of the present disclosure is to provide a method for detecting urea-formaldehyde resin in melamine-formaldehyde materials.

The specific technical solutions for achieving the objective above are as follows:

The present disclosure provides a method for detecting urea-formaldehyde resin in melamine-formaldehyde materials, including the following steps: washing the melamine-formaldehyde material powder to be tested with hydrochloric acid solution, placing it at 110° C.±5° C. for hydrolysis for 60 min±5 min, passing through a polyethersulfone filter membrane to obtain the test solution; detecting the test solution through high-performance liquid chromatography-mass spectrometry; the liquid chromatography conditions include: the chromatographic column is an amino column; gradient elution procedure is: 0 min, 10±2% A; 1.0 min, 10±2% A; 6.0 min, 30±5% A; 10.0 min, 30±5% A; 11.0 min, 10±2% A; 15.5 min, 10±2% A; the mass spectrometry conditions include: GAS 1:60±2 psi; GAS 2: 60±2 psi; Curtain gas: 40±2 psi; Temperature: 650° C.±20° C.

In the present disclosure, by controlling the key technical parameters such as hydrolysis temperature and time in the preparation of the test solution, liquid chromatography gradient elution mobile phase and elution procedure, and mass spectrometry detection conditions, high specificity and sensitivity are achieved to identify whether urea-formaldehyde resin is mixed in the melamine formaldehyde material. Therefore, the detection method of the present disclosure provides good technical support for quality control and safety monitoring of food contact materials and products, and has good economic and social benefits.

DETAILED DESCRIPTION

Figure 1:
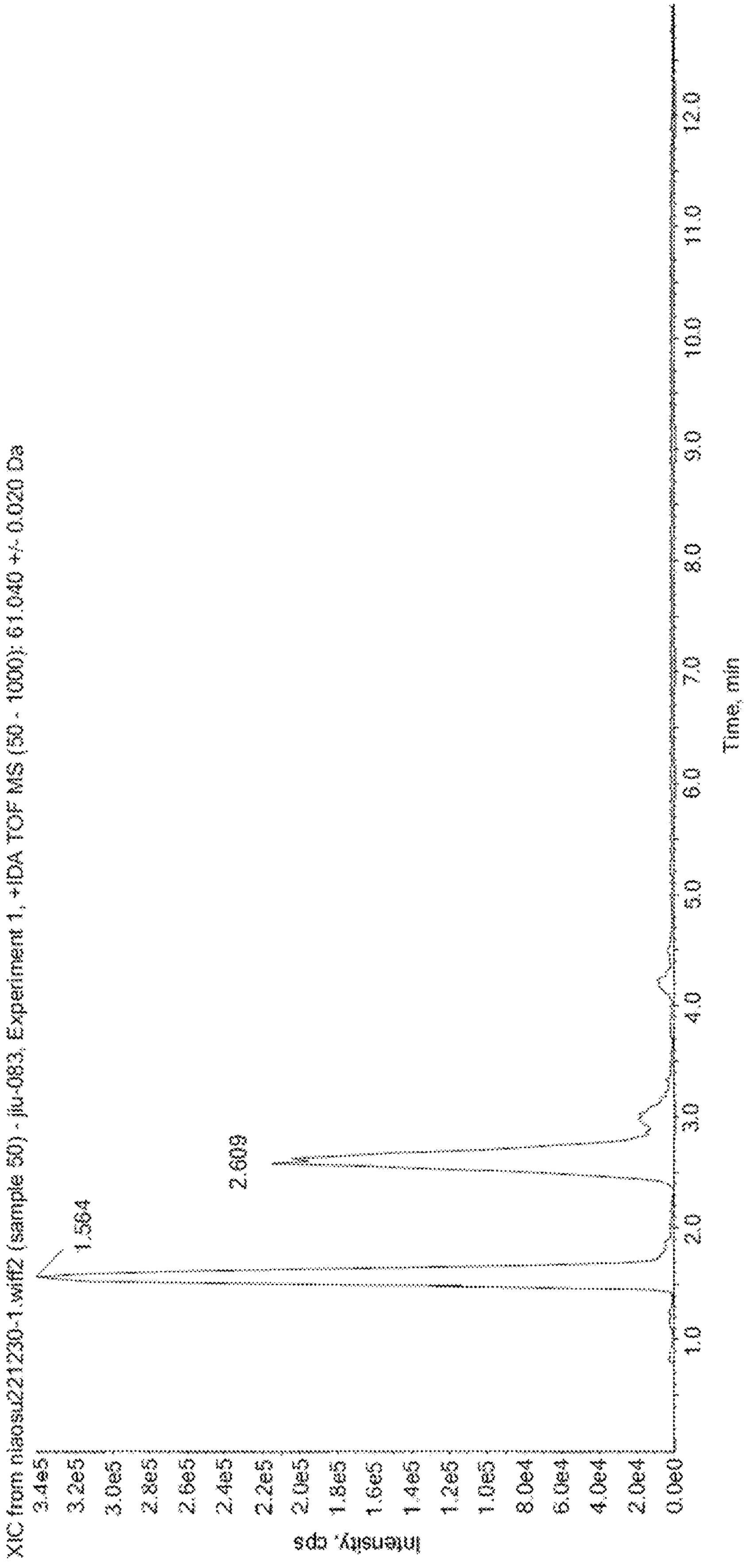
FIG. 1 shows the extraction ion chromatogram of the characteristic hydrolysis product 61.040±0.02 Da of the positive sample in Example 2 of the present disclosure.

In order to facilitate the understanding of the present disclosure, a more comprehensive description about the present disclosure is given below. The present disclosure can be implemented in many different forms, and it is not limited to the examples described herein. On the contrary, the purpose of providing these examples is to make the understanding of the disclosure more thorough and comprehensive.

Unless otherwise defined, all technical and scientific terms used herein have the same meaning as those commonly understood by the skilled in the art of the present disclosure. The terms used in the description of the present disclosure are for description of specific examples only and not intended to limit the present disclosure. The term "and/or" used in the present disclosure includes any and all combinations of one or more related listed items.

In the following examples, if there are no specific conditions indicated, the experimental methods are usually performed in accordance with conventional conditions, such as those described in *Molecular Cloning: A Laboratory Manual,* 2013 by Green and Sambrook et al., or those as recommended by the manufacturers. The various commonly used chemical reagents used in the examples are all commercially available products.

Some examples of the present disclosure disclose a method for detecting urea-formaldehyde resin in melamine-formaldehyde materials, including the following steps: washing the melamine-formaldehyde material powder to be tested with hydrochloric acid solution, placing it at 110° C.±5° C. for hydrolysis for 60 min±5 min, passing through a polyethersulfone filter membrane to obtain the test solution; detecting the test solution through high-performance liquid chromatography-mass spectrometry; the liquid chromatography conditions include: the chromatographic column is an amino column; gradient elution procedure is: 0 min, 10±2% A; 1.0 min, 10±2% A; 6.0 min, 30±5% A; 10.0 min, 30±5% A; 11.0 min, 10±2% A; 15.5 min, 10±2% A; the mass spectrometry conditions include: GAS 1:60±2 psi; GAS 2: 60±2 psi; Curtain gas: 40±2 psi; Temperature: 650° C.±20° C.

In some examples, the gradient elution procedure is: 0 min, 10% A; 1.0 min, 10% A; 6.0 min, 30% A; 10.0 min, 30% A; 11.0 min, 10% A; 15.5 min, 10% A.

In some examples, mobile phase A in the condition of liquid chromatography is an ammonium acetate aqueous solution, and mobile phase B is acetonitrile.

In some examples, the mass concentration of ammonium acetate aqueous solution is 0.36 g/L to 0.40 g/L.

In some examples, the mass spectrometry conditions include: GAS 1:60 psi; GAS 2: 60 psi; Curtain gas: 40 psi; Temperature: 650° C.

In some examples, the hydrolysis temperature is 110° C.±2° C., and the hydrolysis time is 60 min±2 min.

In some examples, the liquid chromatography conditions further include: injection volume: 2±1 μL; flow rate: 0.4±0.1 mL/min.

In some examples, the mass spectrometry conditions further include:

CAD GAS: 7±1
Spray voltage: 3500±50V
TOF MS start mass: 50±5 Da
TOF MS stop mass: 1000±50 Da
TOF MS Accumulation Time: 0.3±0.05 s
TOF MS Declustering Potential: 60±5V
TOF MS DP spread: 0V
TOF MS Collision energy: 10±1V
TOF CE spread: 0V
TOF MSMS start mass: 50±5 Da
TOF MSMS stop mass: 1000±50 Da
TOF MSMS Accumulation Time: 0.1±0.01 s
TOF MSMS Declustering Potential: 60±5V
TOF MSMS DP spread: 0V
TOF MSMS Collision energy: 20±2V
TOF MSMS CE spread 0 V.

In some examples, after the high-performance liquid chromatography-mass spectrometry detection, it further includes the step of detecting chromatographic peaks. When one or more of the following chromatographic peaks 1 to 11 appear in the test solution, there is urea-formaldehyde resin mixing in the test solution:

Chromatographic peak 1: mass spectrometric molecular weight 61.040±0.02 Da, retention time 1.0 min to 2.0 min;

Chromatographic peak 2: mass spectrometric molecular weight 613.266±0.02 Da, retention time 0.8 min to 7.5 min;

Chromatographic peak 3: mass spectrometric molecular weight 479.183±0.02 Da, retention time 2.0 min to 8.0 min;

Chromatographic peak 4: mass spectrometric molecular weight 331.147±0.02 Da, retention time 1.5 min to 6.0 min;

Chromatographic peak 5: mass spectrometric molecular weight 155.054±0.02 Da, retention time 1.5 min to 4.0 min;

Chromatographic peak 6: mass spectrometric molecular weight 145.072±0.02 Da, retention time 1.0 min to 6.5 min;

Chromatographic peak 7: mass spectrometric molecular weight 217.104±0.02 Da, retention time 1.0 min to 6.5 min;

Chromatographic peak 8: mass spectrometric molecular weight 299.119±0.02 Da, retention time 1.5 min to 6.5 min;

Chromatographic peak 9: mass spectrometric molecular weight 329.129±0.02 Da, retention time 1.5 min to 6.0 min;

Chromatographic peak 10: mass spectrometric molecular weight 185.065±0.02 Da, retention time 1.0 min to 4.0 min; and Chromatographic peak 11: mass spectrometric molecular weight 371.153±0.02 Da, retention time 1.5 min to 7.0 min.

In some examples, the concentration of the hydrochloric acid solution ranges from 0.10 mol/L to 0.15 mol/L.

In some examples, every 10 mL of the test solution contains 0.05 g to 0.07 g of the sample powder to be tested.

The method for detecting urea-formaldehyde resin in melamine-formaldehyde materials of the present disclosure is to use high-performance liquid chromatography quadrupole time-of-flight mass spectrometry instrument to detect the characteristic hydrolyzate of urea-formaldehyde resin. (The high performance liquid chromatography-quadrupole time-of-flight mass spectrometry instrument uses liquid chromatography as the separation system, electric spray or atmospheric chemical ionization source as the ionization mode, and uses quadrupole tandem time-of-flight as a mass spectrometry analysis technology of the mass analyzer. Its multi-dimensional analysis parameter setting, high sensitivity, high resolution, and high acquisition speed endow it with extremely high capability to collect and analyze chemical components. Combined with the huge data processing and statistical analysis functions of the software, it can achieve specific screening and identification effects that cannot be achieved by conventional spectral). The technical effect of identifying whether urea-formaldehyde resin is mixed in melamine-formaldehyde materials with high specificity and high sensitivity is achieved through the overall coordination of key technical parameters such as appropriate hydrolysis temperature, liquid chromatography gradient elution mobile phase and elution procedure, and mass spectrometry detection conditions in the preparation of the test solution; the detection limit of urea, the characteristic hydrolysate of urea-formaldehyde resin, is as high as 1%, with excellent sensitivity, and can provide accurate molecular weight for the characteristic hydrolysates (accurate to four decimal places). Therefore, the chromatogram will not be affected by the components contained in the matrix, and it is not easy to decipher the identification method through new mixing techniques. It provides good technical support for quality control and safety monitoring of food contact materials and products, and has good economic and social benefits.

In the following examples, the chromatographic column used is the Ultimate HILIC Amide 100 mmx 2.1 mm, 5 μm chromatographic column from Yuexu Company; the liquid chromatograph used is the Acquire UPLC H-Class PLUS from Waters Company, and the mass spectrometer used is the X500B quadrupole time-of-flight mass spectrometer from Scienx Company.

Example 1: A Method for Detecting Whether Melamine Formaldehyde Material is Mixed with Urea Formaldehyde Resin including the following steps:

1. Preparation of the Standard Solution

Weighed about 10 mg of urea standard solution into a 10 mL volumetric flask, diluted with water and adjusted the volume to the scale, and mixed well. The concentration of this standard stock solution was 1000 mg/L. Used a graduated Pipette to transfer 2 mL of the standard stock solution into a 100 mL volumetric flask, diluted it to the scale with water, and mixed well. The concentration of the standard working solution was 20.0 mg/L. Then transferred 0 mL, 0.25 mL, 0.50 mL, 1.00 mL, 2.50 mL, 5.00 mL of 20 mg/L standard working solution into six 10 mL volumetric flasks respectively, diluted to the scale with water, and mixed well. The concentrations of these working fluids were 0 mg/L, 0.50 mg/L, 1.00 mg/L, 2.00 mg/L, 5.00 mg/L, and 10.0 mg/L respectively. These standard working solutions were used for confirming the status of the instrument.

2. Preparation of the Test Solution

The sample to be tested was processed into powder with a tool and mixed well. Weighed 0.06 g of the sample and placed into a 2 mL plastic centrifuge tube, washed the powder three times with 4.5 mL of 0.12 mol/L hydrochloric acid solution, and discarded the washing solution. Transferred the powder completely into a 25 mL polytetrafluoroethylene inner tank of hydrothermal reactor kettle with 4.5 mL of 0.12 mol/L hydrochloric acid solution and sealed the tank. Placed the hydrothermal reaction kettle in a 110° C. oven for 60 min 5 min. Then took it out, cooled to room temperature, opened the tank, completely transferred the powder and liquid in the tank into a 10 mL colorimetric tube, washed the inner wall of the tank with water, and transferred the washing solution to the same colorimetric tube; diluted with water to the mark, and vortex mixed well. Took approximately 1 mL of the solution and passed it through the polyethersulfone filter membrane to obtain the test solution.

Simultaneously prepared blank test solution.

3. High Performance Liquid Chromatography Quadrupole Time-of-Flight Mass Spectrometer Detection Tested the standard solution, blank test solution and test solution on the machine to obtain the original data. The conditions for chromatographic determination included:

Chromatographic column: amino column, 100 mm×2.1 mm, 5 μm;

Mobile phase combination: A: 0.38 g ammonium acetate and 1 L water, B: acetonitrile;

Injection volume: 2 μL;

Flow rate: 0.4 mL/min;

Mobile phase elution procedure 1: 0 min, 10% A; 1.0 min, 10% A; 6.0 min, 30% A; 10.0 min, 30% A; 11.0 min, 10% A; 15.5 min, 10% A.

The conditions for mass spectrometry included (TOF MS or IDA scanning mode, electric spray ion source, positive ionization mode):

GAS 1: 60 psi
GAS 2: 60 psi
Curtain gas: 40 psi
CAD GAS: 7
Temperature: 650° C.
Spray voltage: 3500V
TOF MS start mass: 50 Da
TOF MS stop mass: 1000 Da
TOF MS Accumulation Time: 0.3 s
TOF MS Declustering Potential: 60V
TOF MS DP spread: 0V
TOF MS Collision energy: 10V
TOF CE spread: 0V
TOF MSMS start mass: 50 Da
TOF MSMS stop mass: 1000 Da
TOF MSMS Accumulation Time: 0.1 s
TOF MSMS Declustering Potential: 60V
TOF MSMS DP spread: 0V
TOF MSMS Collision energy: 20V
TOF MSMS CE spread 0 V.

4. Result Analysis

When one or more of the following urea chromatographic peaks, or the urea and other chromatographic peaks, appeared in the chromatogram of the test solution, it could be determined that there was urea-formaldehyde resin mixed in the test solution:

Chromatographic peak 1 (urea): mass spectrometric molecular weight 61.040±0.02 Da, retention time 1.0 min to 2.0 min;

Chromatographic peak 2: mass spectrometric molecular weight 613.266±0.02 Da, retention time 0.8 min to 7.5 min;

Chromatographic peak 3: mass spectrometric molecular weight 479.183±0.02 Da, retention time 2.0 min to 8.0 min;

Chromatographic peak 4: mass spectrometric molecular weight 331.147±0.02 Da, retention time 1.5 min to 6.0 min;

Chromatographic peak 5: mass spectrometric molecular weight 155.054±0.02 Da, retention time 1.5 min to 4.0 min;

Chromatographic peak 6: mass spectrometric molecular weight 145.072±0.02 Da, retention time 1.0 min to 6.5 min;

Chromatographic peak 7: mass spectrometric molecular weight 217.104±0.02 Da, retention time 1.0 min to 6.5 min;

Chromatographic peak 8: mass spectrometric molecular weight 299.119±0.02 Da, retention time 1.5 min to 6.5 min;

Chromatographic peak 9: mass spectrometric molecular weight 329.129±0.02 Da, retention time 1.5 min to 6.0 min;

Chromatographic peak 10: mass spectrometric molecular weight 185.065±0.02 Da, retention time 1.0 min to 4.0 min; and Chromatographic peak 11: mass spectrometric molecular weight 371.153±0.02 Da, retention time 1.5 min to 7.0 min.

Example 2: Detection of Whether the Melamine-Formaldehyde Material Sample was Mixed with Urea-Formaldehyde Resin Using the Method of Example 1

Drilled powder from 17 melamine-formaldehyde samples that contact food (including trays, dishes, bowls, plates) with an electric drill. After collecting the powder, prepared and detected the test solutions according to the method in Example 1.

Figure 2:
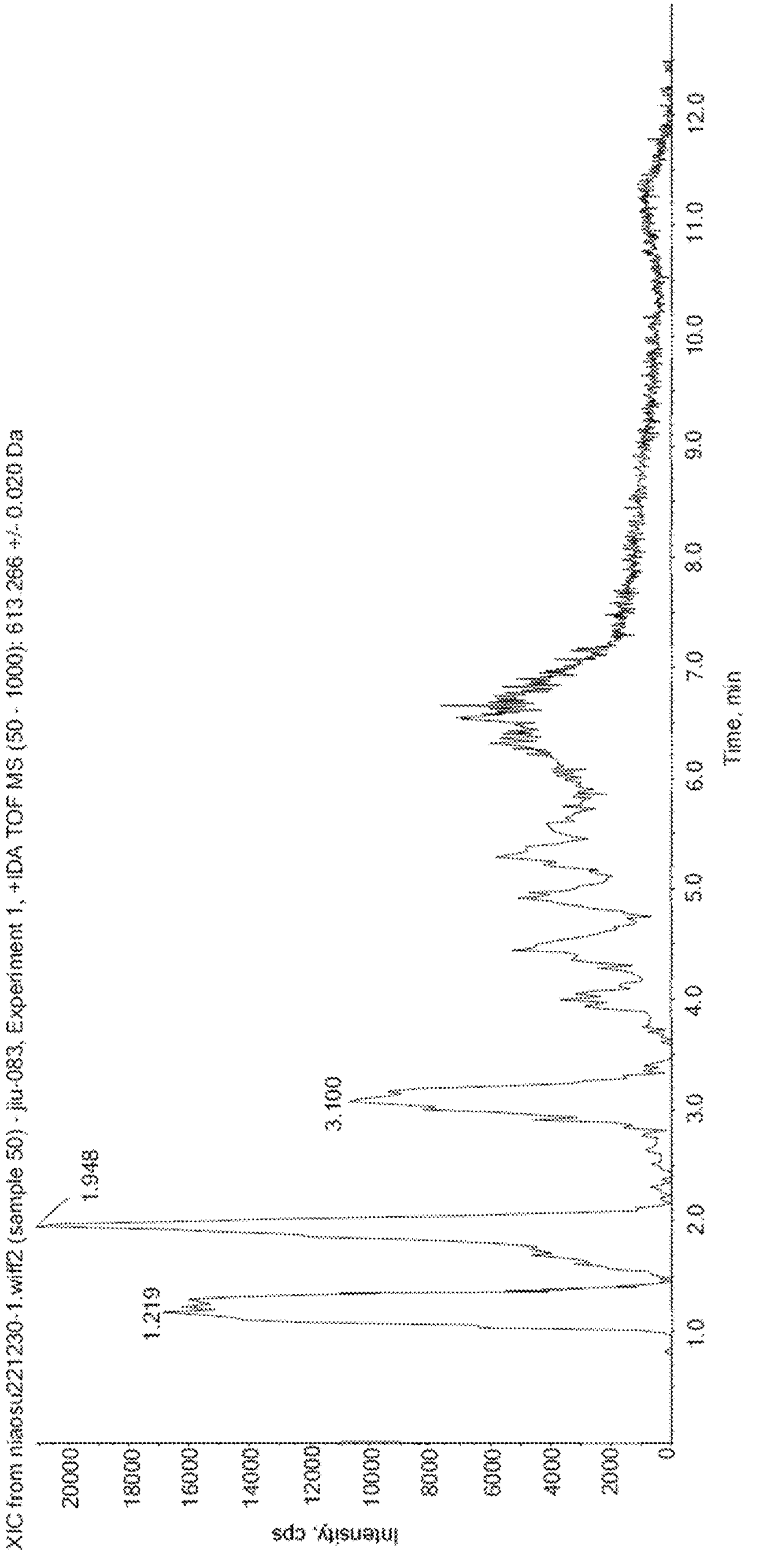
FIG. 2 shows the extraction ion chromatogram of the characteristic hydrolysis product 613.266±0.02 Da of the positive sample in Example 2 of the present disclosure.
Figure 3:
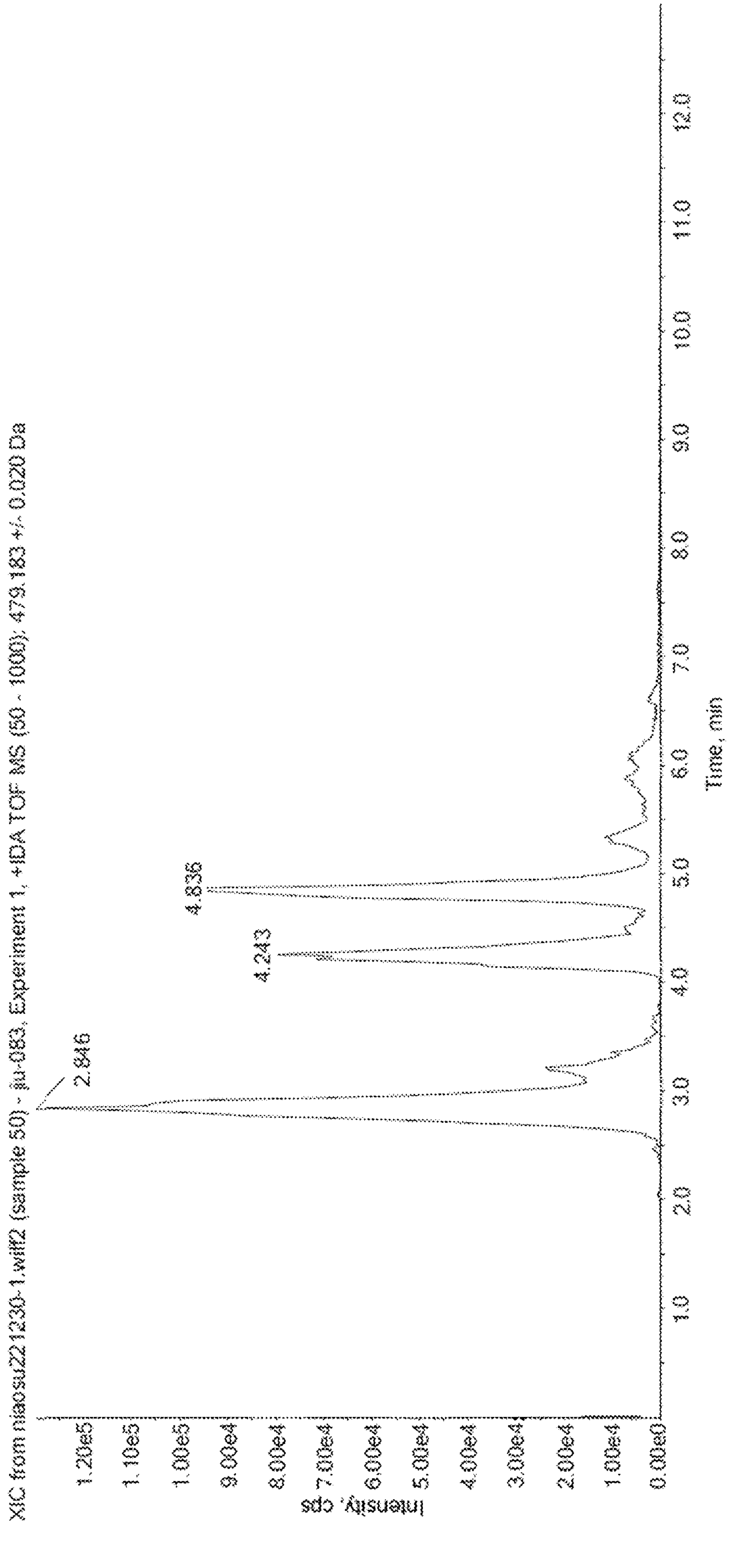
FIG. 3 shows the extraction ion chromatogram of the characteristic hydrolysis product 479.183±0.02 Da of the positive sample in Example 2 of the present disclosure.
Figure 4:
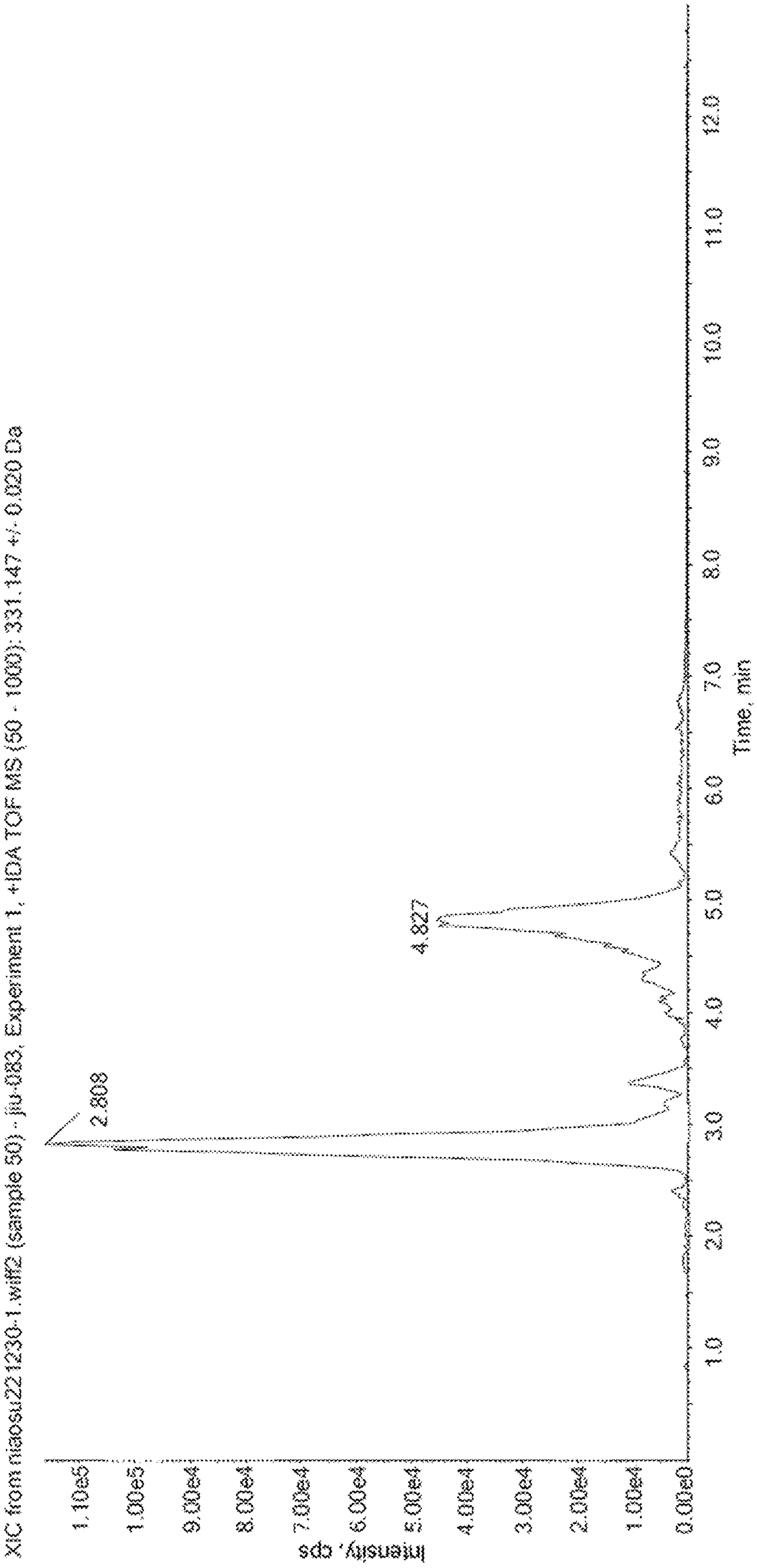
FIG. 4 shows the extraction ion chromatogram of the characteristic hydrolysis product 331.147±0.02 Da of the positive sample in Example 2 of the present disclosure.
Figure 5:
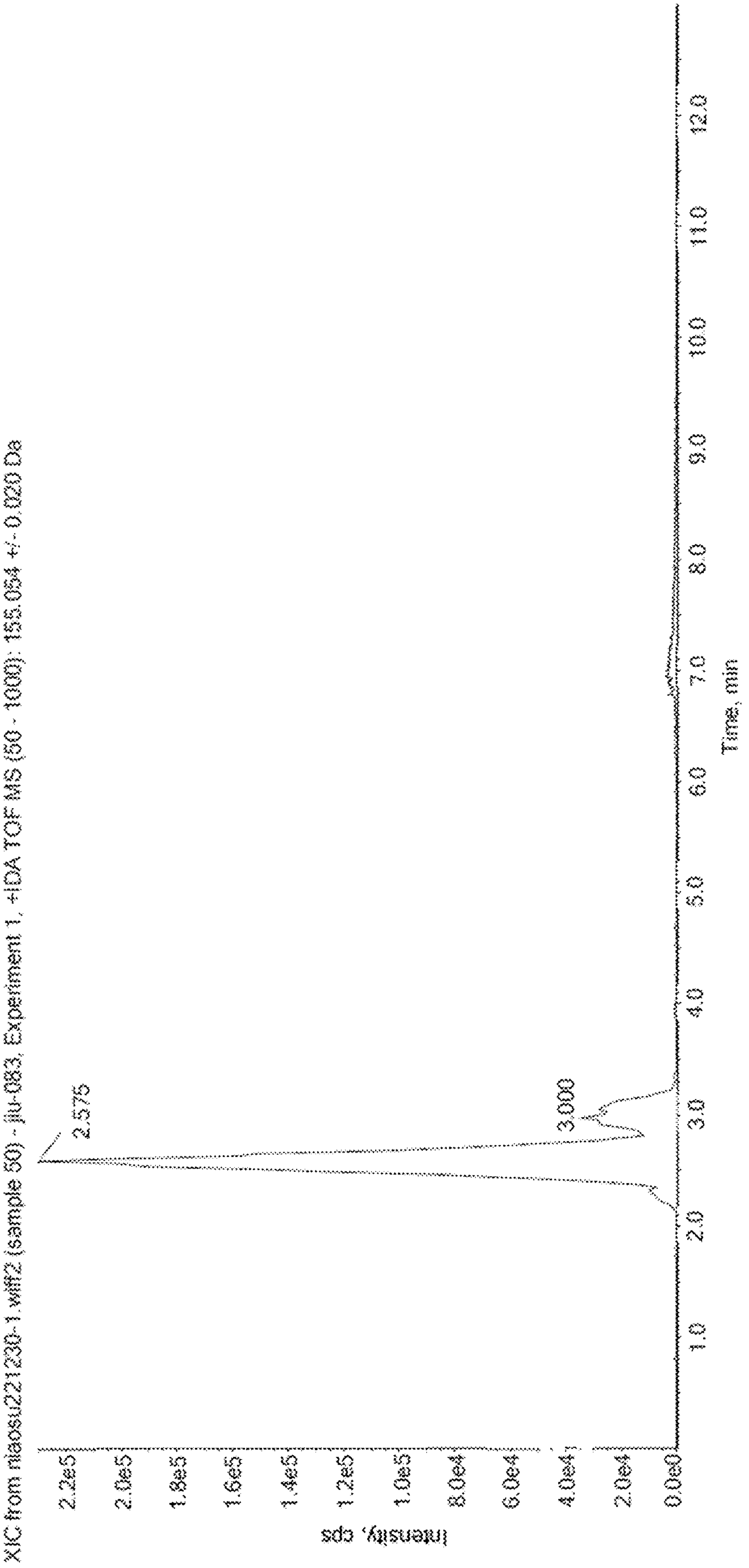
FIG. 5 shows the extraction ion chromatogram of the characteristic hydrolysis product 155.054±0.02 Da of the positive sample in Example 2 of the present disclosure.
Figure 6:
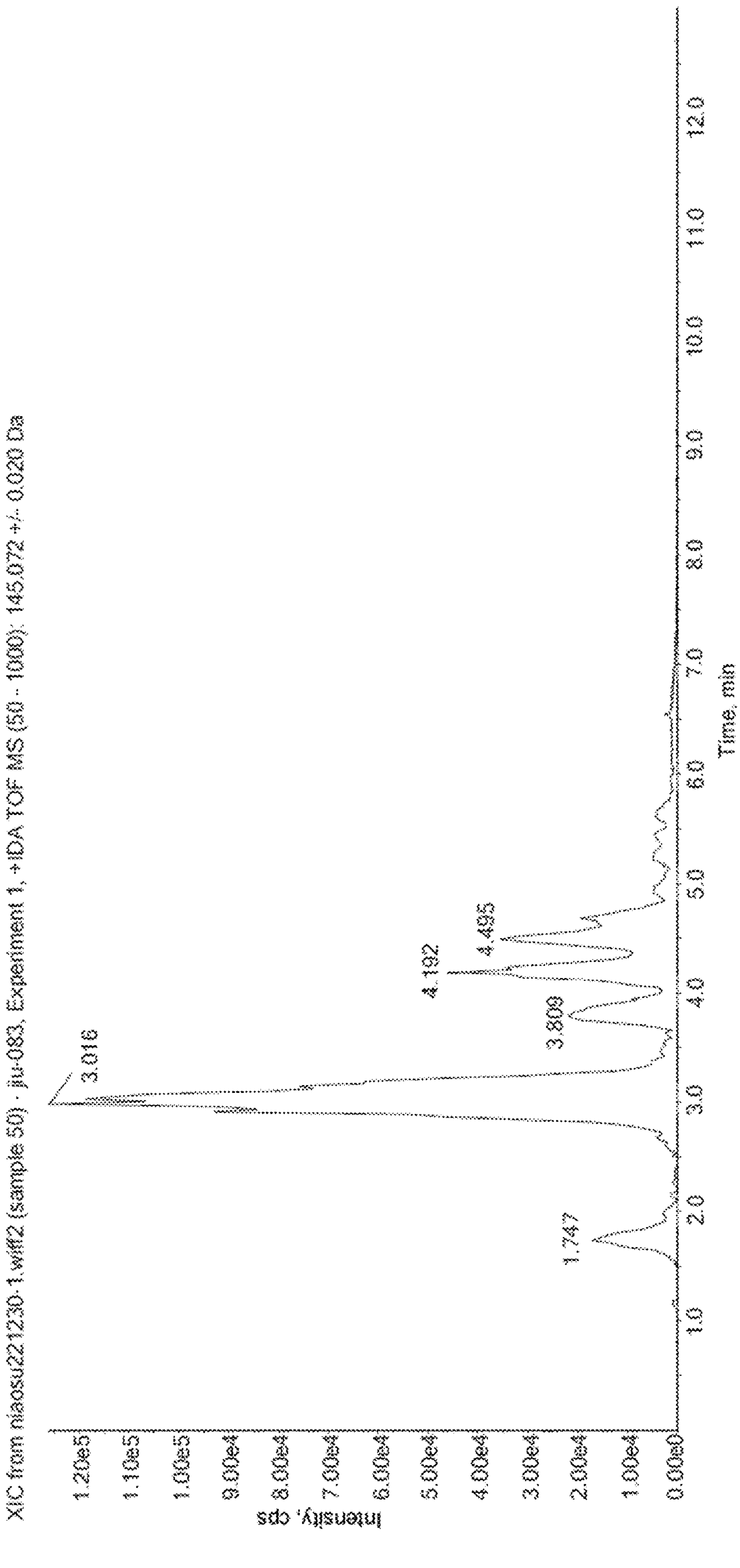
FIG. 6 shows the extraction ion chromatogram of the characteristic hydrolysis product 145.072±0.02 Da of the positive sample in Example 2 of the present disclosure.
Figure 7:
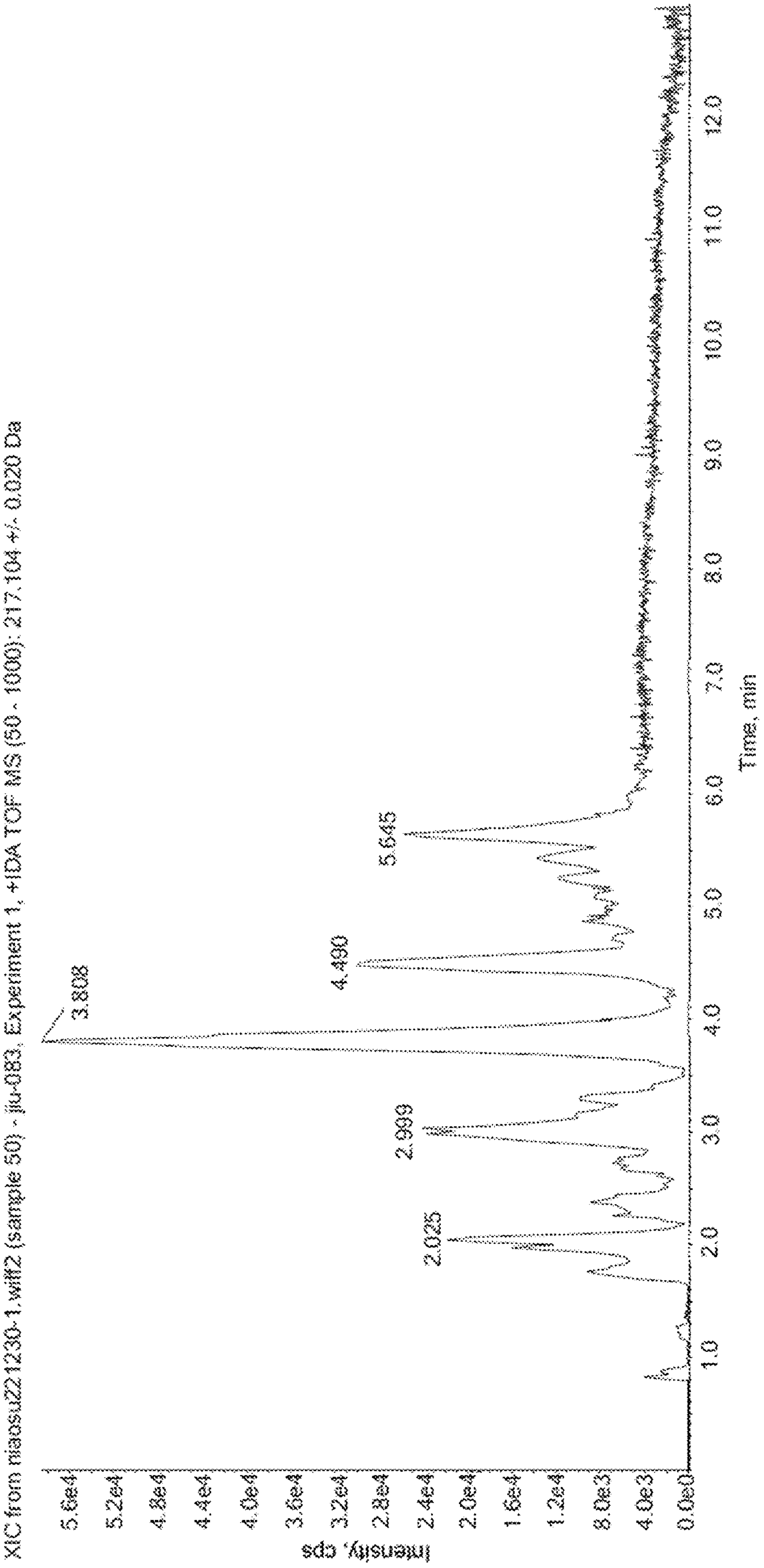
FIG. 7 shows the extraction ion chromatogram of the characteristic hydrolysis product 217.104±0.02 Da of the positive sample in Example 2 of the present disclosure.
Figure 8:
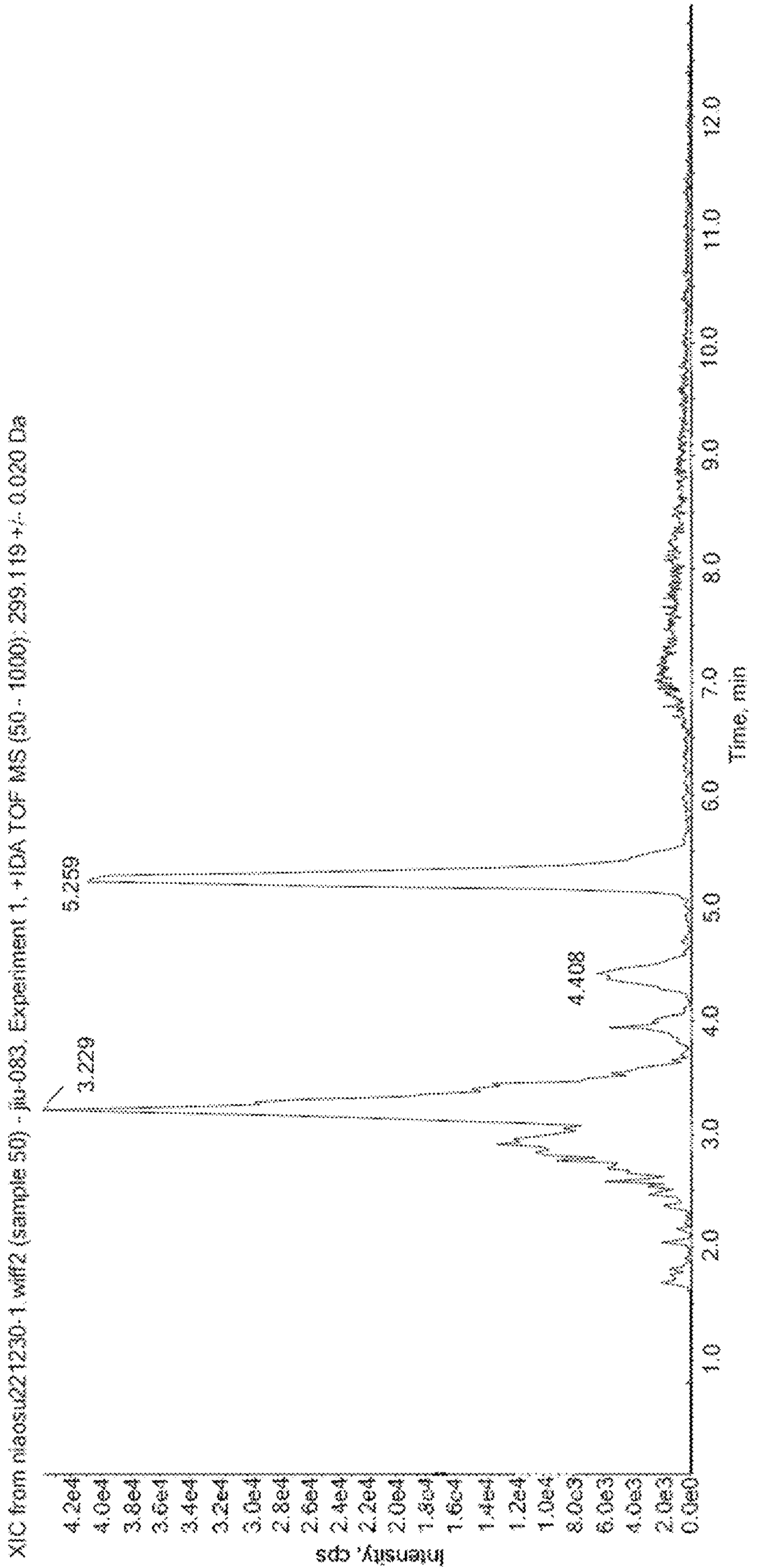
FIG. 8 shows the extraction ion chromatogram of the characteristic hydrolysis product 299.119±0.02 Da of the positive sample in Example 2 of the present disclosure.
Figure 9:
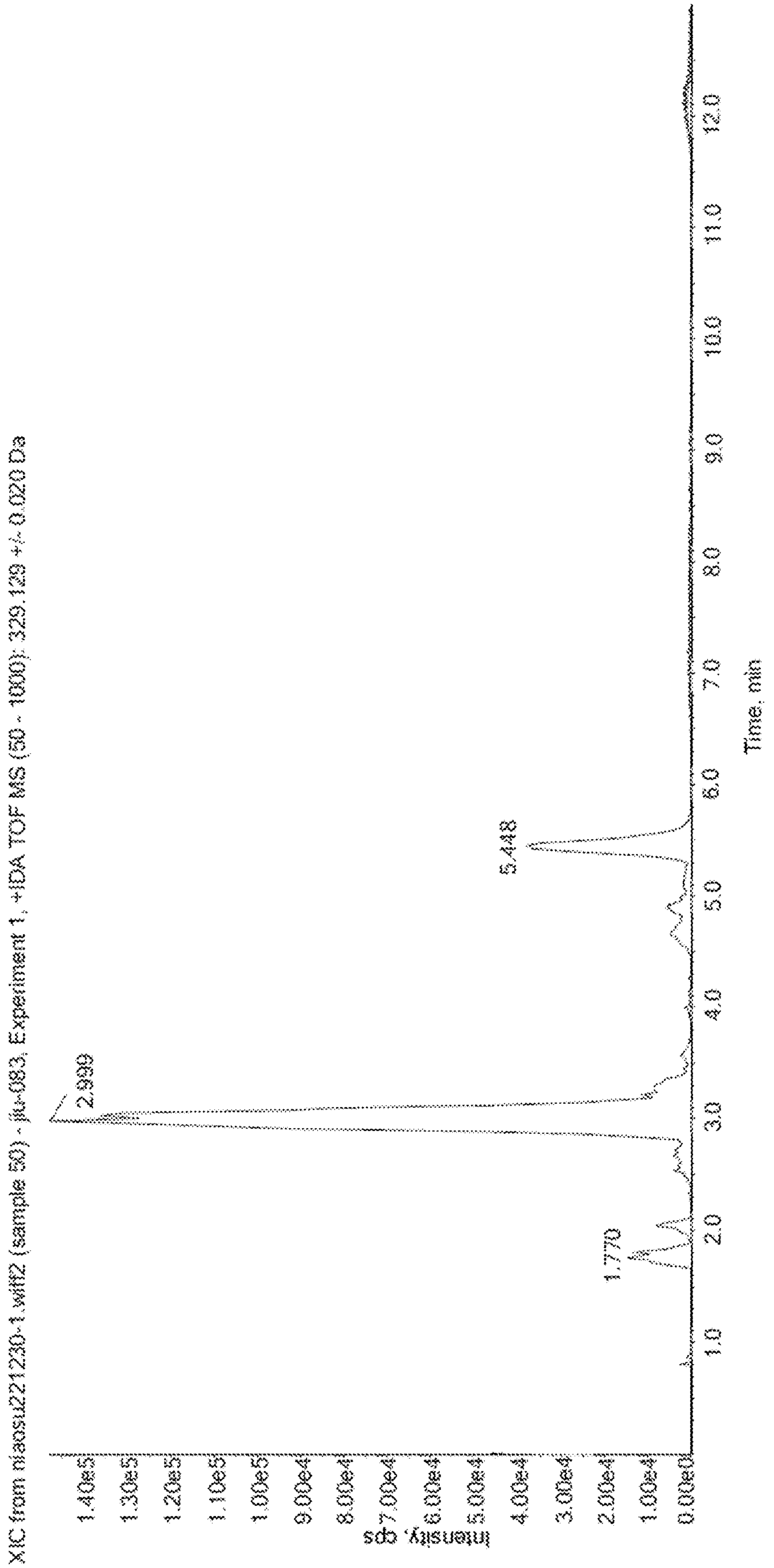
FIG. 9 shows the extraction ion chromatogram of the characteristic hydrolysis product 329.129±0.02 Da of the positive sample in Example 2 of the present disclosure.
Figure 10:
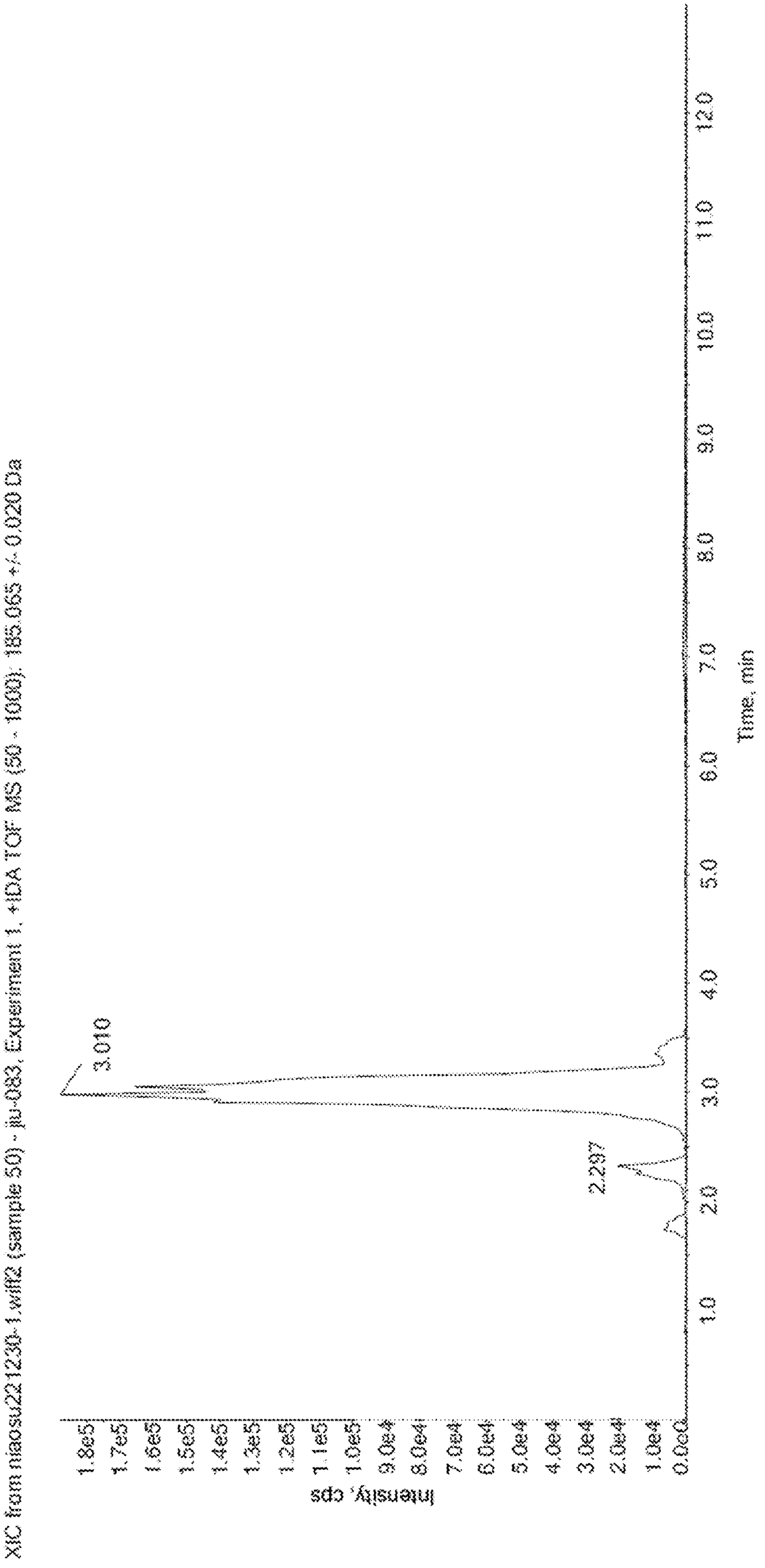
FIG. 10 shows the extraction ion chromatogram of the characteristic hydrolysis product 185.065±0.02 Da of the positive sample in Example 2 of the present disclosure.
Figure 11:
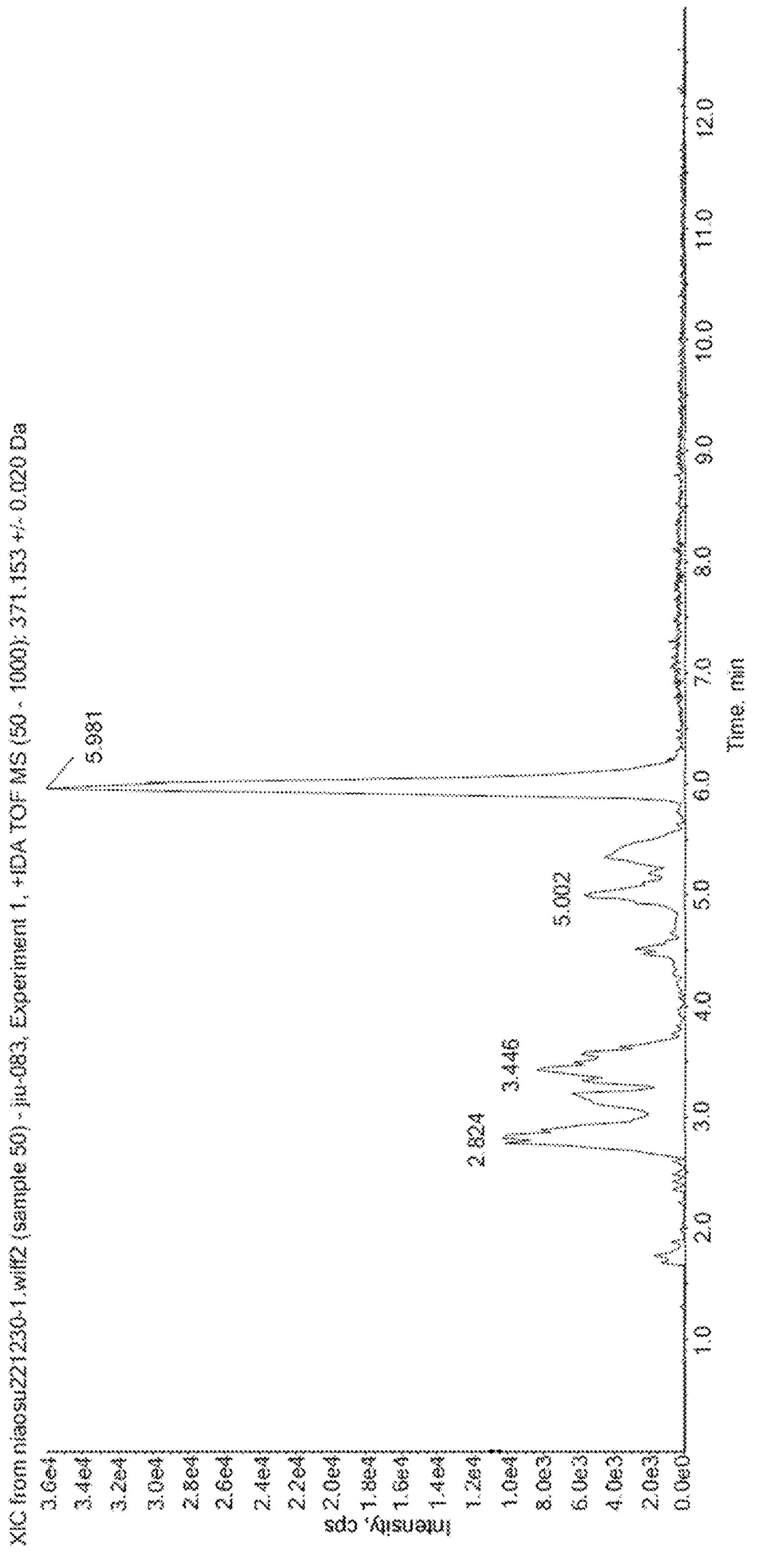
FIG. 11 shows the extraction ion chromatogram of the characteristic hydrolysis product 371.153±0.02 Da of the positive sample in Example 2 of the present disclosure.
Figure 12:
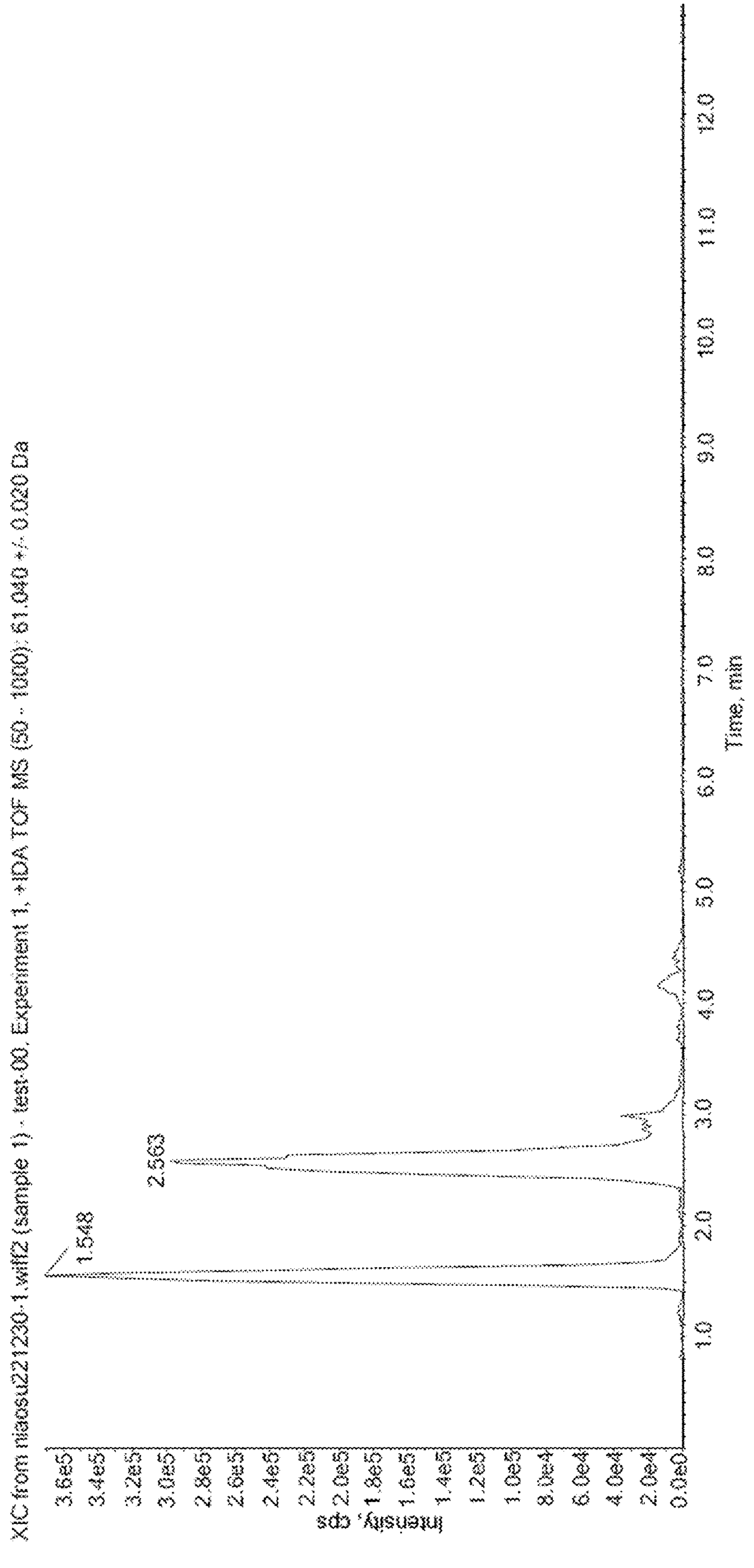
FIG. 12 shows the extraction ion chromatogram of the characteristic hydrolysis product 61.040±0.02 Da when Urea-formaldehyde: melamine-formaldehyde=90:10 in Example 3 of the present disclosure.
Figure 13:
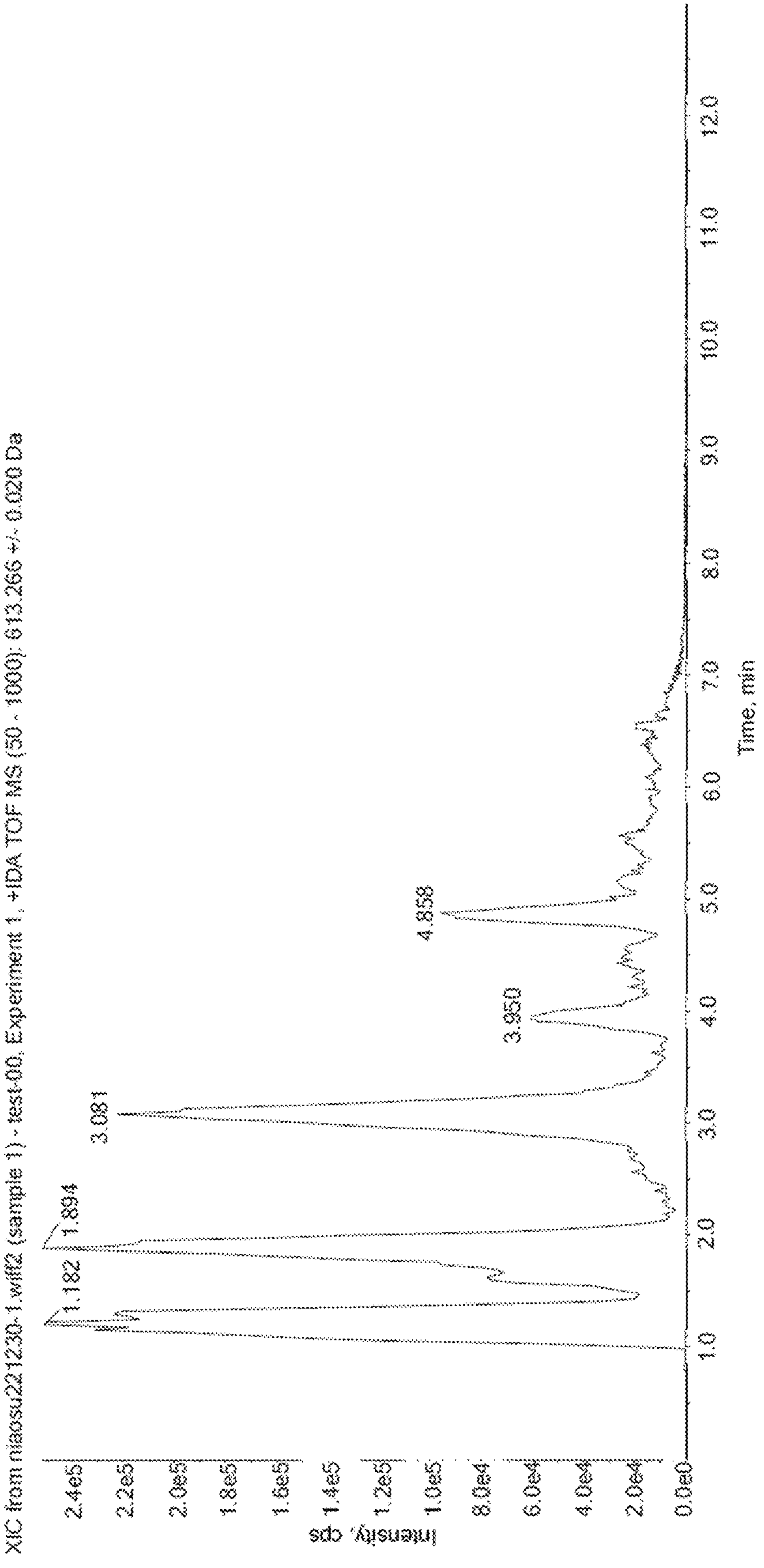
FIG. 13 shows the extraction ion chromatogram of the characteristic hydrolysis product 613.266±0.02 Da when Urea-formaldehyde: melamine-formaldehyde=90:10 in Example 3 of the present disclosure.
Figure 14:
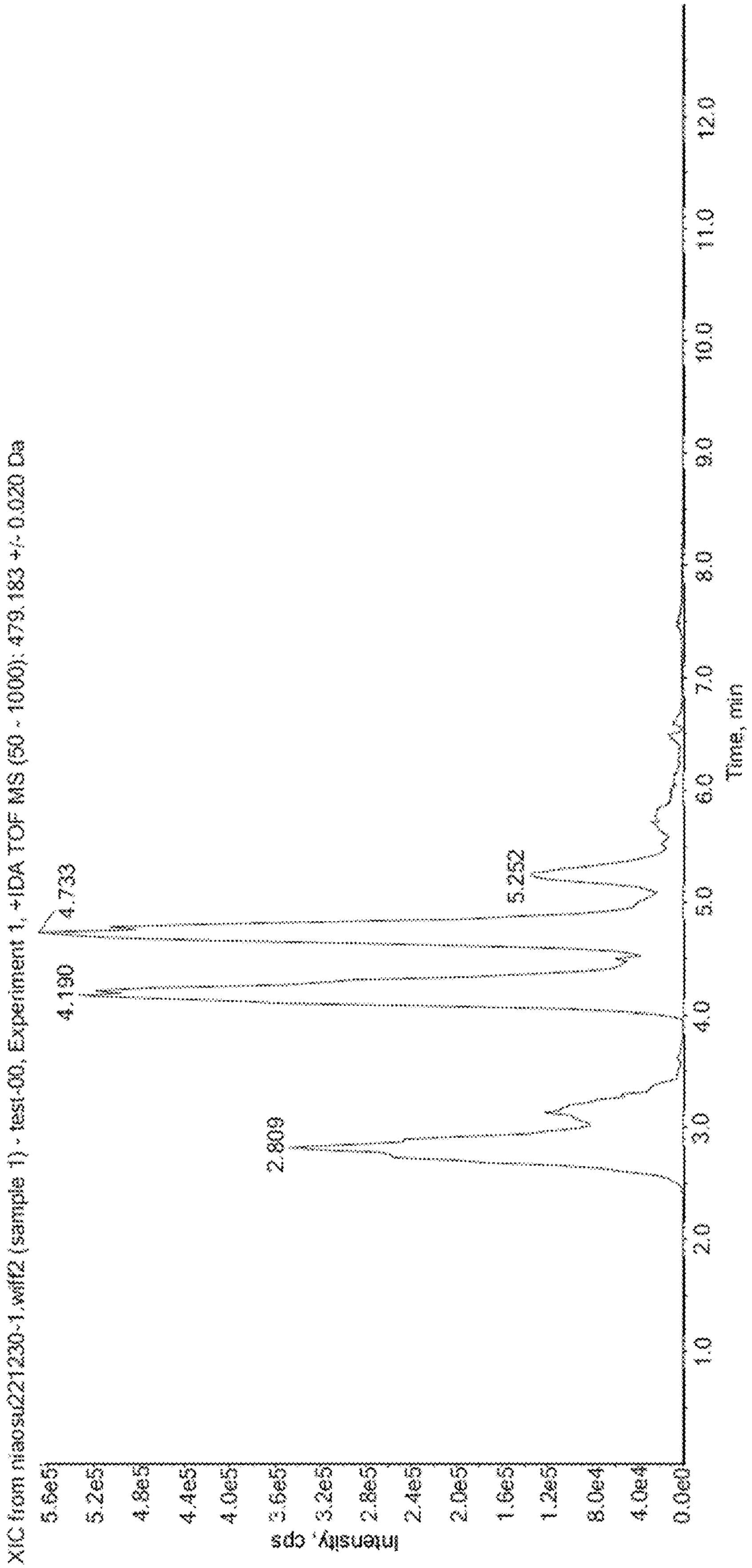
FIG. 14 shows the extraction ion chromatogram of the characteristic hydrolysis product 479.183±0.02 Da when Urea-formaldehyde: melamine-formaldehyde=90:10 in Example 3 of the present disclosure.
Figure 15:
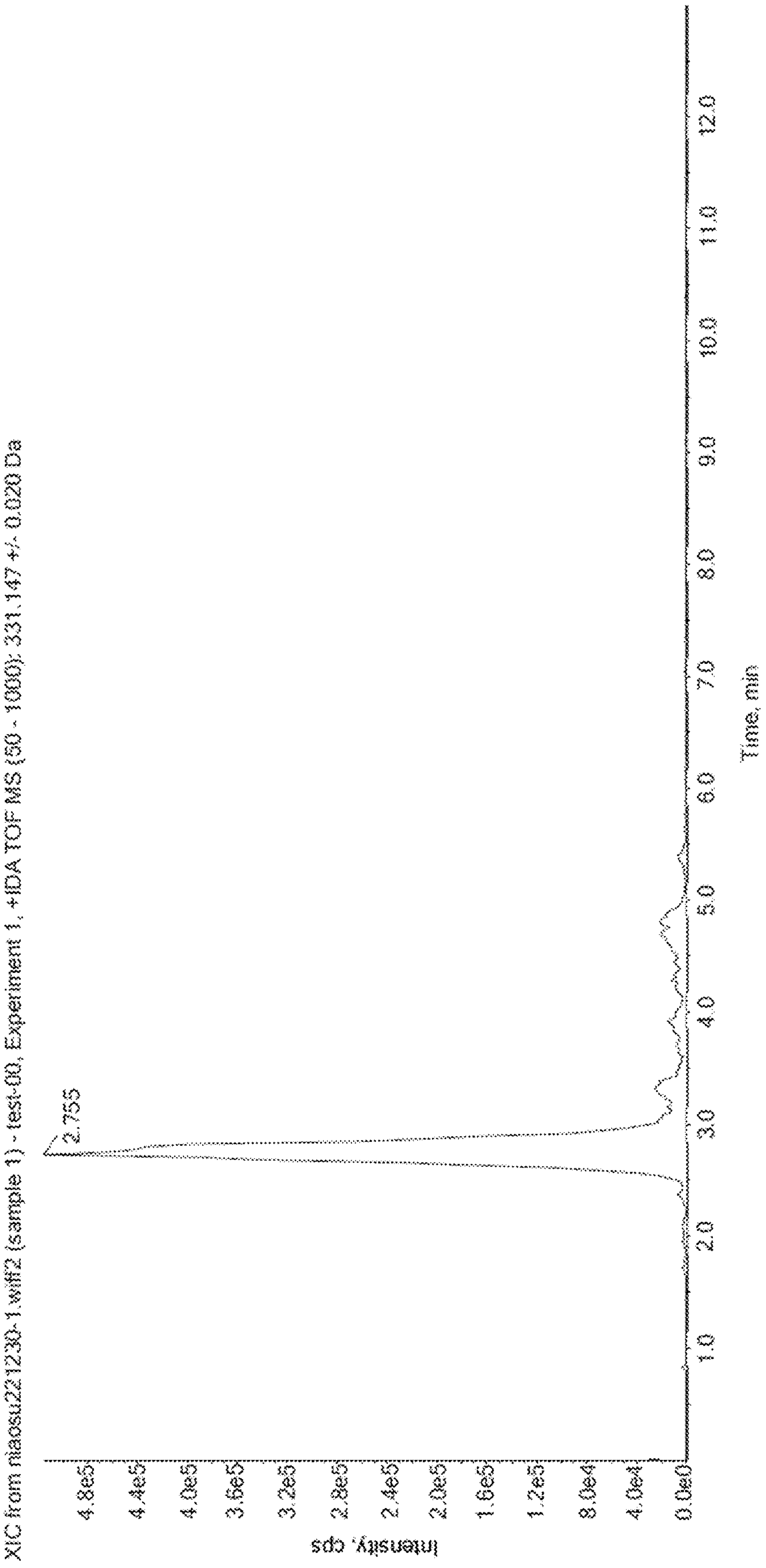
FIG. 15 shows the extraction ion chromatogram of the characteristic hydrolysis product 331.147±0.02 Da when Urea-formaldehyde: melamine-formaldehyde=90:10 in Example 3 of the present disclosure.
Figure 16:
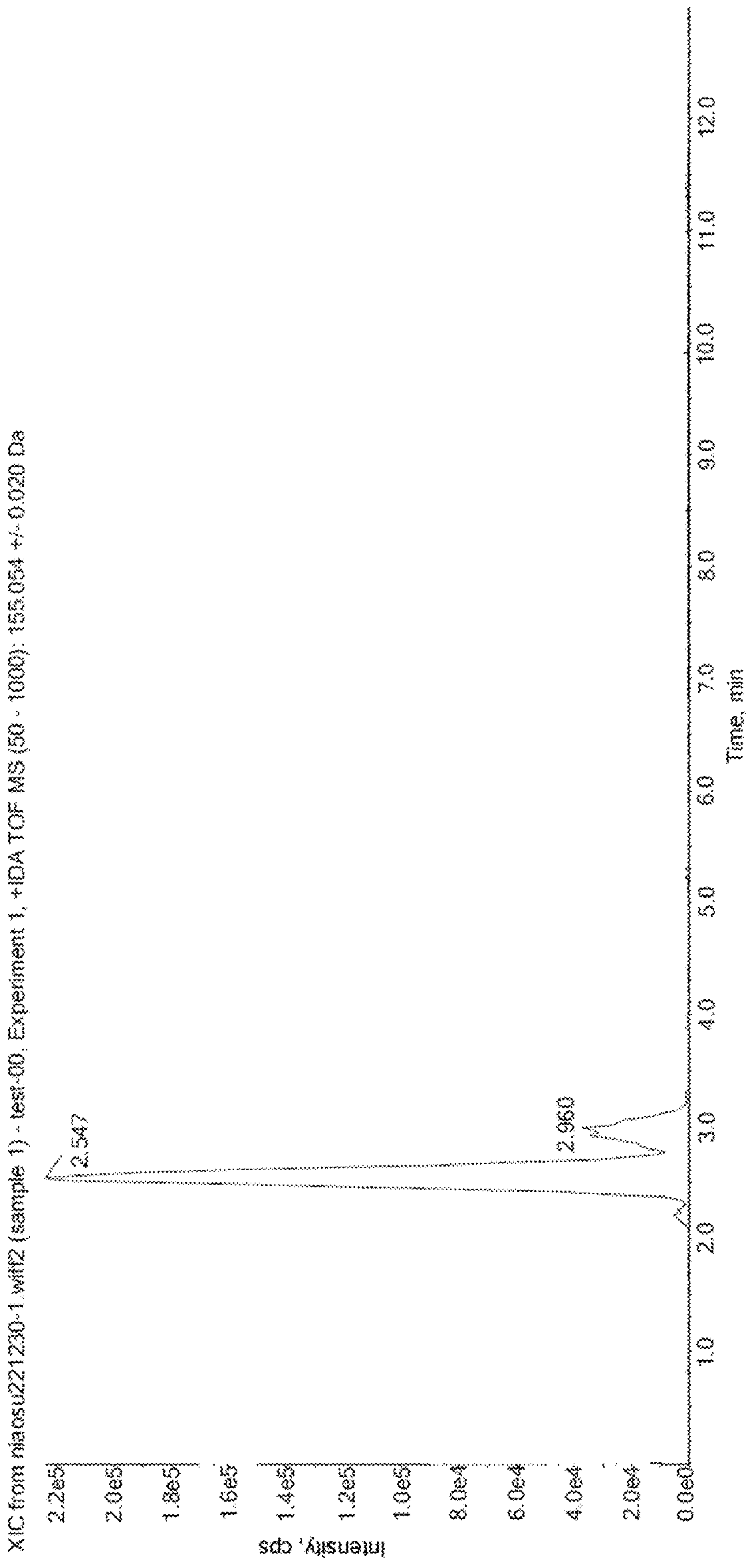
FIG. 16 shows the extraction ion chromatogram of the characteristic hydrolysis product 155.054±0.02 Da when Urea-formaldehyde: melamine-formaldehyde=90:10 in Example 3 of the present disclosure.
Figure 17:
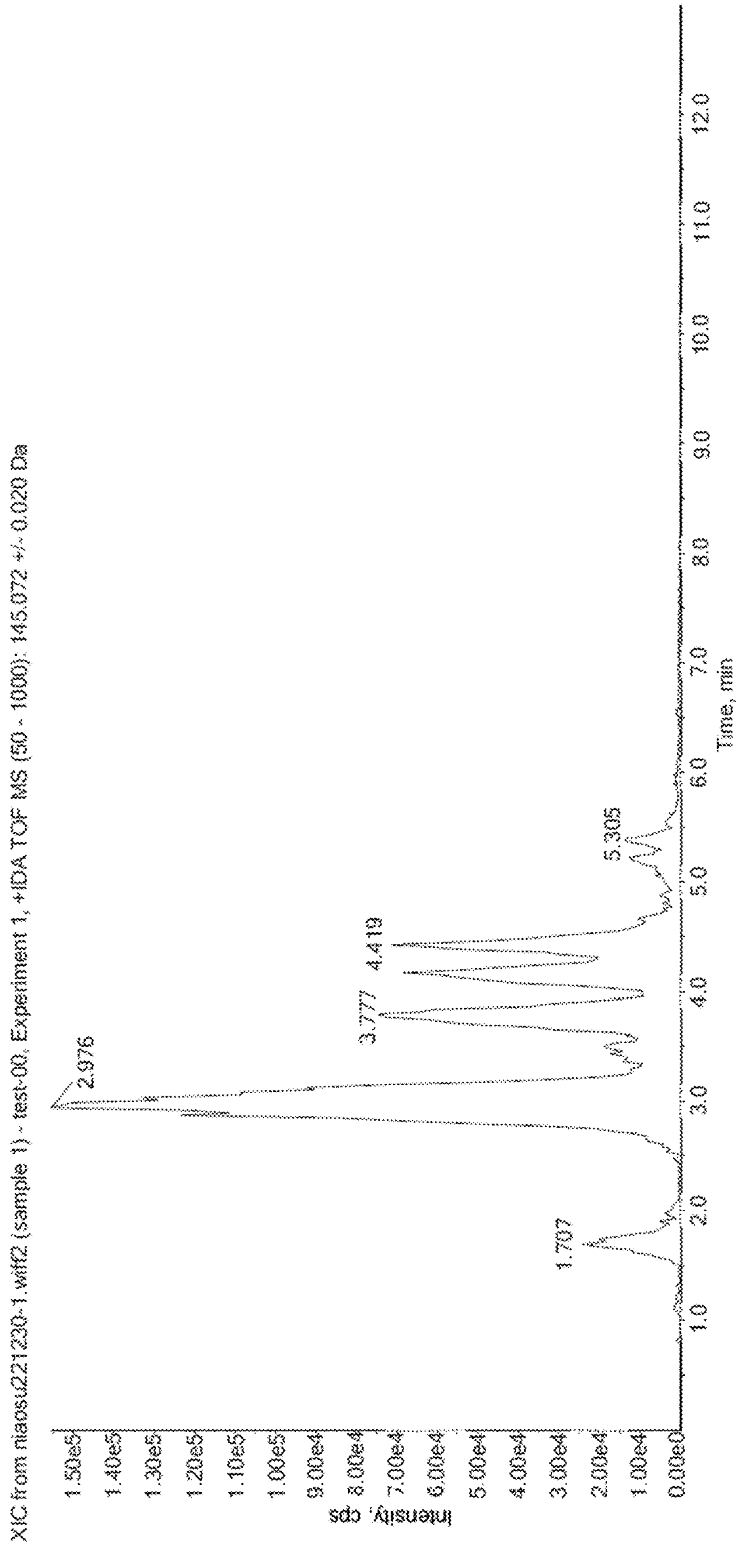
FIG. 17 shows the extraction ion chromatogram of the characteristic hydrolysis product 145.072±0.02 Da when Urea-formaldehyde: melamine-formaldehyde=90:10 in Example 3 of the present disclosure.
Figure 18:
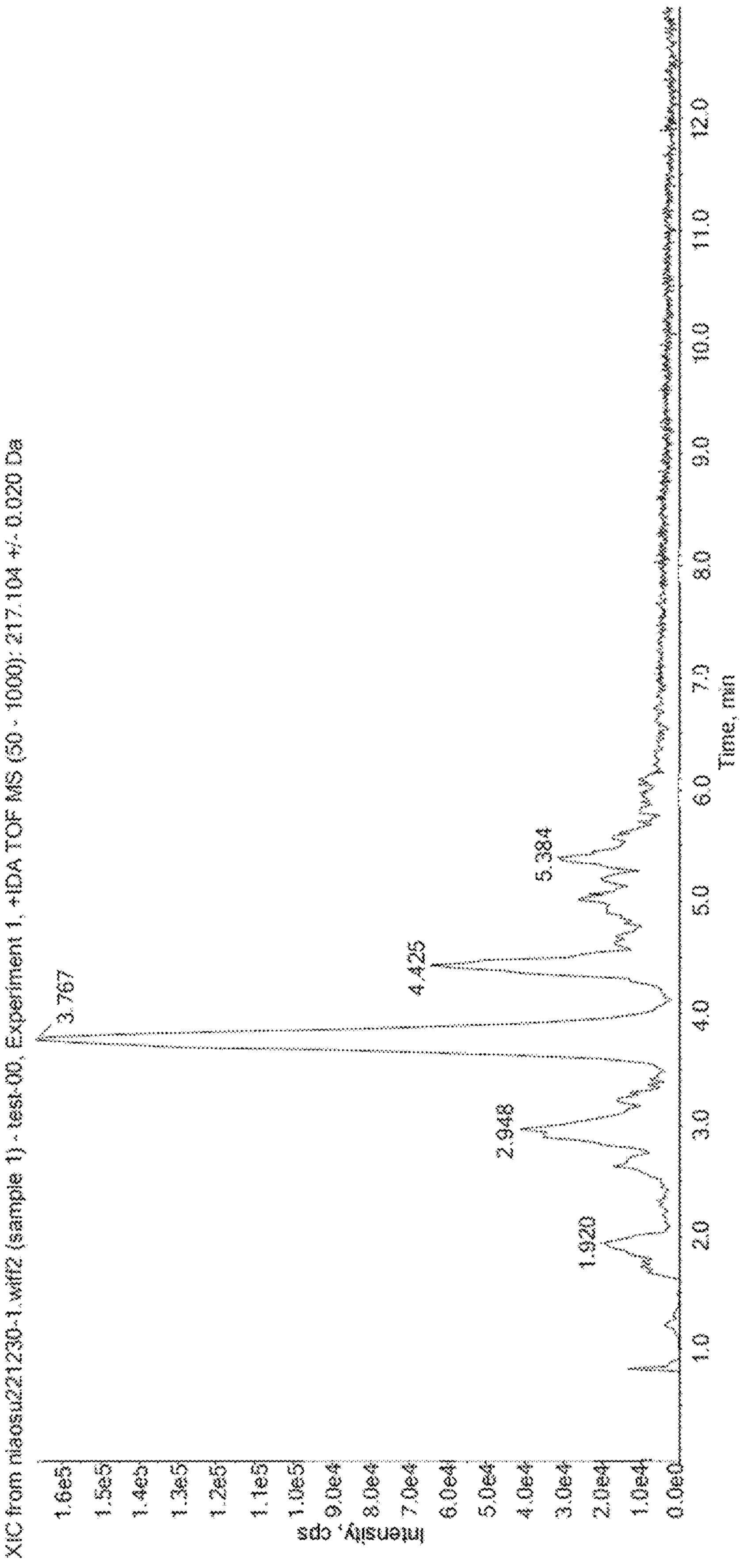
FIG. 18 shows the extraction ion chromatogram of the characteristic hydrolysis product 217.104±0.02 Da when Urea-formaldehyde: melamine-formaldehyde=90:10 in Example 3 of the present disclosure.
Figure 19:
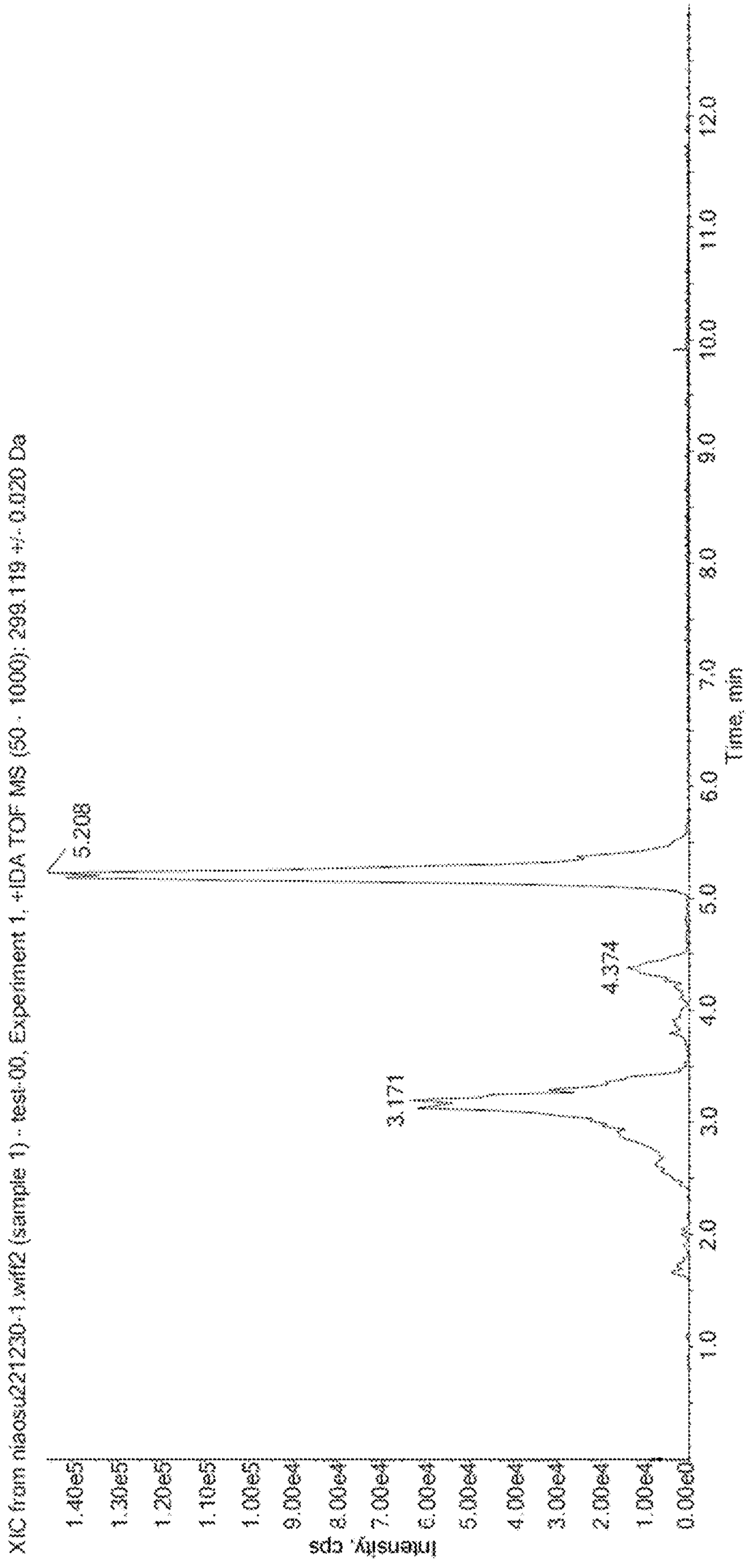
FIG. 19 shows the extraction ion chromatogram of the characteristic hydrolysis product 299.119±0.02 Da when Urea-formaldehyde: melamine-formaldehyde=90:10 in Example 3 of the present disclosure.
Figure 20:
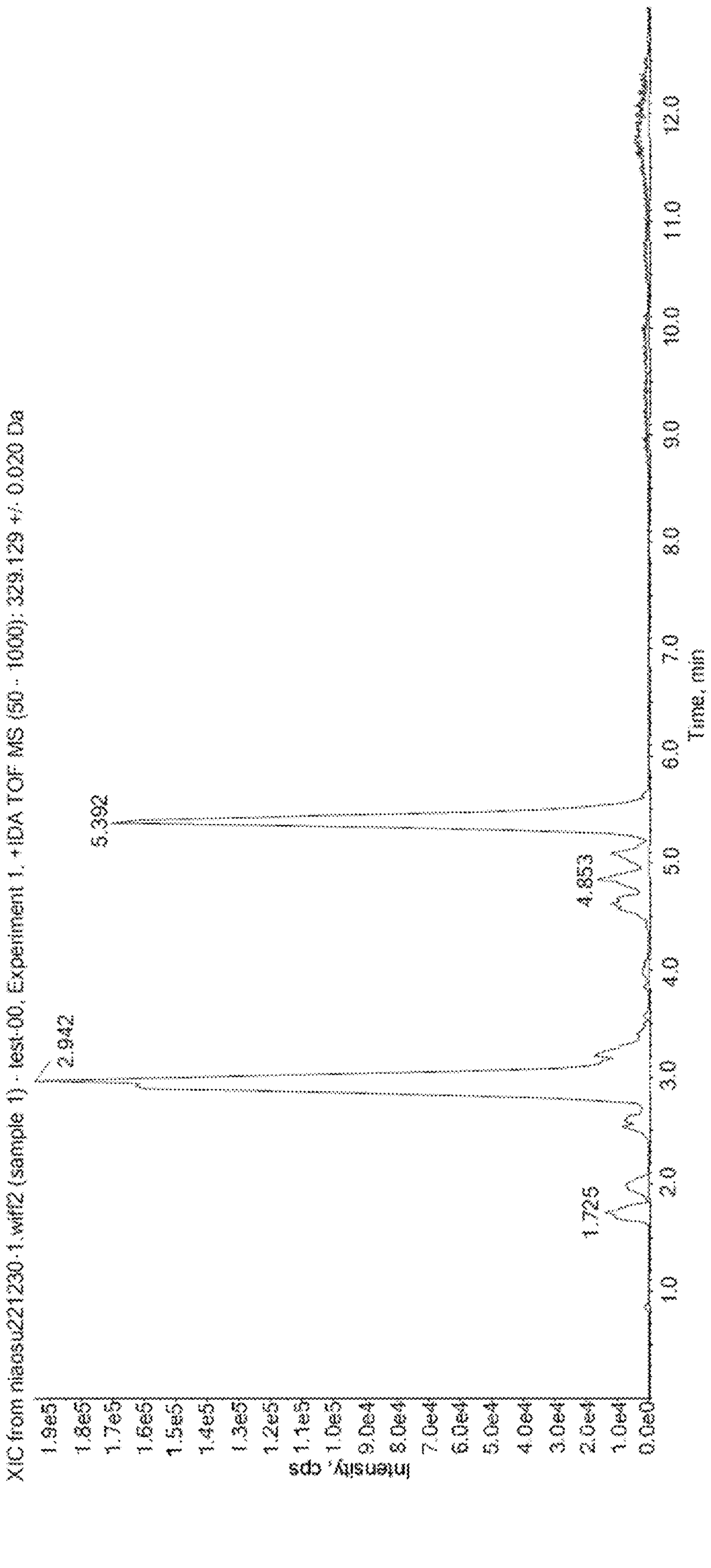
FIG. 20 shows the extraction ion chromatogram of the characteristic hydrolysis product 329.129±0.02 Da when Urea-formaldehyde: melamine-formaldehyde=90:10 in Example 3 of the present disclosure.
Figure 21:
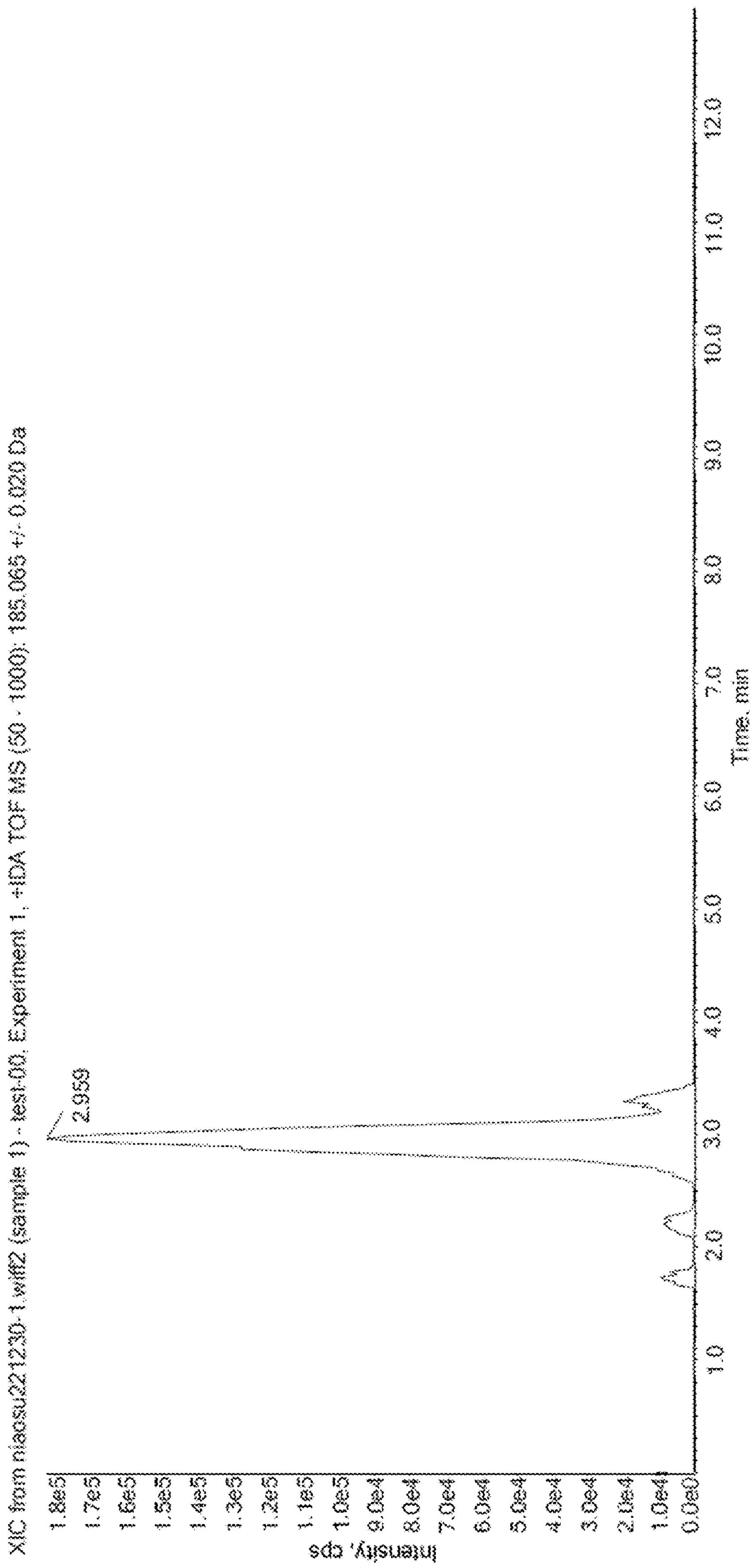
FIG. 21 shows the extraction ion chromatogram of the characteristic hydrolysis product 185.065±0.02 Da when Urea-formaldehyde: melamine-formaldehyde=90:10 in Example 3 of the present disclosure.
Figure 22:
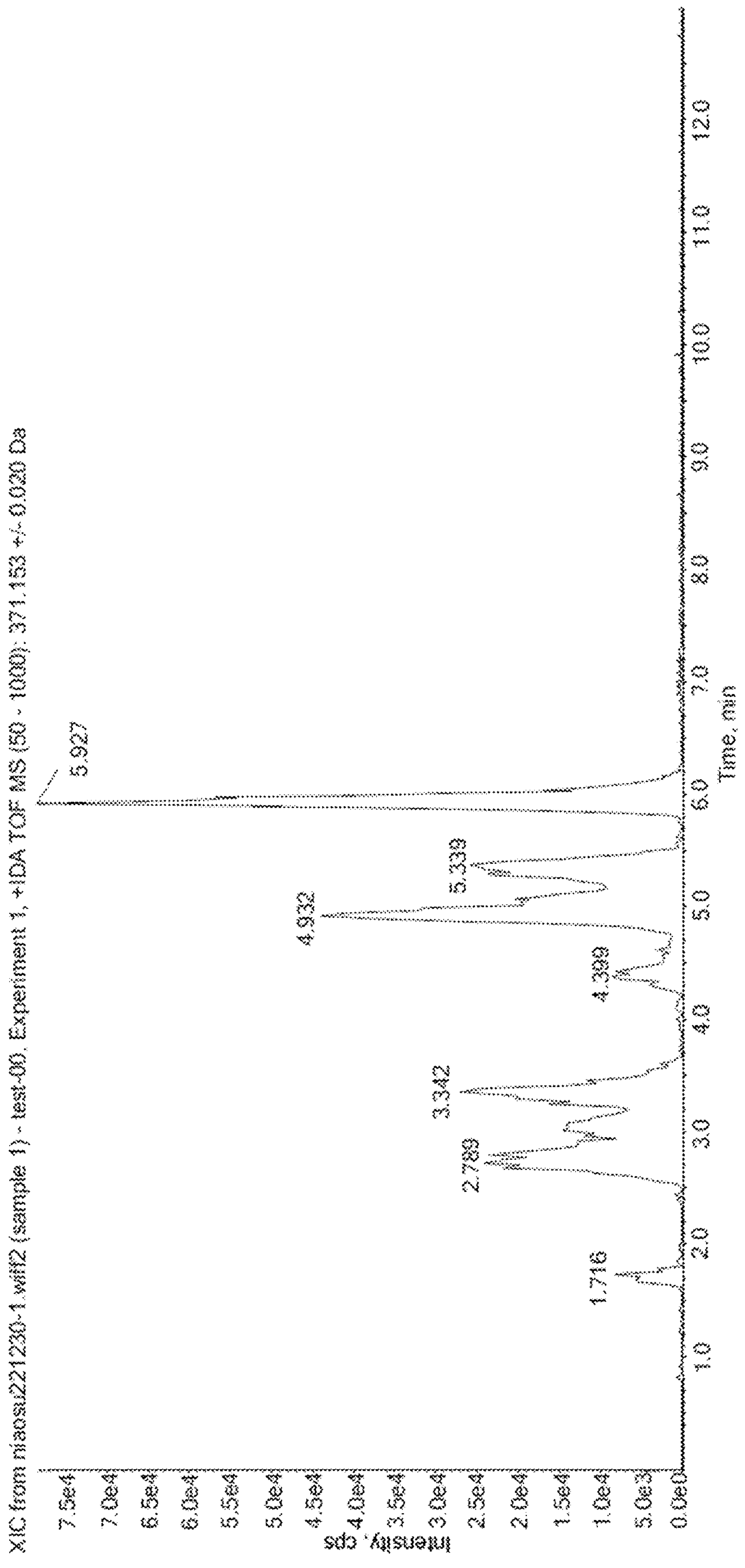
FIG. 22 shows the extraction ion chromatogram of the characteristic hydrolysis product 371.153±0.02 Da when Urea-formaldehyde: melamine-formaldehyde=90:10 in Example 3 of the present disclosure.

Among the 17 samples to be tested, no characteristic hydrolysis product chromatographic peaks were detected in 16 samples, and all characteristic hydrolysis product chromatographic peaks were detected in one tray sample. The extraction ion chromatograms of the characteristic hydrolysis products are shown in FIG. 1 to FIG. 11 respectively. Its chromatographic peak area×$10^5$ were respectively: chromatographic peak 1 (urea): 31.1, chromatographic peak 2: 5.52, chromatographic peak 3: 18.1, chromatographic peak 4: 14.6, chromatographic peak 5: 34.0, chromatographic peak 6: 21.8, chromatographic peak 7: 6.38, chromatographic peak 8: 3.99, chromatographic peak 9: 17.4, chromatographic peak 10: 29.5, and chromatographic peak 11: 3.08.

Example 3: Detection Limit and Precision of the Detection Method of the Present Disclosure Melamine-formaldehyde resin and urea-formaldehyde resin were fully mixed in different proportions (the resins were purchased from Guangdong Shunde Hengye Synthetic Materials Co., Ltd.). The mixing ratio of the prepared samples (urea formaldehyde: melamine formaldehyde) included 1:99, 2:98, 5:95, 10:90, 30:70, 50:50, 70:30, and 90:10.

Weighed 5.00 g each of melamine-formaldehyde resin, urea-formaldehyde resin and mixed resins of different proportions into ten 50 mL beakers lined with tin foil, compacted them with stainless steel sheets, and wrapped them in tin foil. Placed the beakers into a oven at 130° C. for 1 hour. After taking out the samples, crushed them separately and mixed well.

Prepared the standard working solution according to step 1 of Example 1, prepared the test sample solutions according to step 2, and performed high-performance liquid chromatography quadrupole time-of-flight mass spectrometry detection according to step 3. The raw data of each compound were processed according to Table 1. When urea-formaldehyde: melamine-formaldehyde=90:10, the extraction ion chromatograms of the characteristic hydrolysis products 12-22 are shown in FIGS. 1 to 11 respectively.

TABLE 1

| No. | Molecular formula | Ionization method | Extracting molecular weight (Da) | Extracting molecular weight window width (Da) | Retention time of integral peak(min) |
|---|---|---|---|---|---|
| 1 | $CH_4N_2O$ (urea) | $[M + H]^+$ | 61.040 | ±0.02 | 1.6 |
| 2 | $C_{19}H_{32}N_{16}O_8$ | $[M + H]^+$ | 613.266 | ±0.02 | 1.0-2.3 |

TABLE 1-continued

| No. | Molecular formula | Ionization method | Extracting molecular weight (Da) | Extracting molecular weight window width (Da) | Retention time of integral peak(min) |
|---|---|---|---|---|---|
| 3 | $C_{14}H_{24}N_{12}O_6$ | $[M + Na]^+$ | 479.183 | ±0.02 | 4.3 |
| 4 | $C_{10}H_{18}N_8O_5$ | $[M + H]^+$ | 331.147 | ±0.02 | 2.8 |
| 5 | $C_3H_8N_4O_2$ | $[M + Na]^+$ | 155.054 | ±0.02 | 2.2-3.4 |
| 6 | $C_4H_8N_4O_2$ | $[M + H]^+$ | 145.072 | ±0.02 | 3.0 |
| 7 | $C_6H_{12}N_6O_3$ | $[M + H]^+$ | 217.104 | ±0.02 | 3.8 |
| 8 | $C_7H_{16}N_8O_4$ | $[M + Na]^+$ | 299.119 | ±0.02 | 5.3 |
| 9 | $C_8H_{18}N_8O_5$ | $[M + Na]^+$ | 329.129 | ±0.02 | 3.0 |
| 10 | $C_4H_{10}N_4O_3$ | $[M + Na]^+$ | 185.065 | ±0.02 | 3.0 |
| 11 | $C_{11}H_{18}N_{10}O_5$ | $[M + H]^+$ | 371.153 | ±0.02 | 6.0 |

1. Urea Detection Limit and Working Curve

The working solution with a concentration of 0.5 mg/L of urea had a peak signal-to-noise ratio (S/N) greater than 4, and the detection limit of the urea instrument could reach 0.5 mg/L.

The concentration range of urea working curve was 1.0-20.0 mg/L, urea working curve Area$\times10^{-5}$=0.021$\times$Concentration$^2$+1.222$\times$Concentration+0.7538, correlation coefficient r=0.9988.

2. Peak Area and Precision of Characteristic Hydrolysis Products

The peak area$\times10^{-5}$ values of each characteristic hydrolysis product are shown in Table 2 to Table 12. Among them, 1% urea-formaldehyde, 5% urea-formaldehyde, 30% urea-formaldehyde, and 70% urea-formaldehyde resin were measured six times in parallel. The 30% urea formaldehyde resin was also measured twice in parallel on the second day and the third day respectively. N. D represents no peak.

TABLE 2

Peak area of characteristic hydrolysis products chromatographic peak 1 (urea)

| Sample | Measured peak area × $10^{-5}$ 1 | 2 | 3 | 4 | 5 | 6 | Average value | RSD (%) |
|---|---|---|---|---|---|---|---|---|
| melamine | N.D. | N.D. | — | — | — | — | N.D | — |
| 1% urea-formaldehyde | 3.67 | 3.97 | 3.11 | 3.25 | 3.04 | 2.94 | 3.33 | 12.2 |
| 2% urea-formaldehyde | 5.31 | — | — | — | — | — | — | — |
| 5% urea-formaldehyde | 9.14 | 8.89 | 9.66 | 10.7 | 8.97 | 9.58 | 9.48 | 6.9 |
| 10% urea-formaldehyde | 14.7 | — | — | — | — | — | — | — |
| 30% urea-formaldehyde | 25.4 | 27.1 | 24.3 | 27.4 | 24.7 | 25.8 | 25.8 | 4.8 |
| 50% urea-formaldehyde | 31.6 | — | — | — | — | — | — | — |
| 70% urea-formaldehyde | 32.2 | — | — | — | — | — | — | — |
| 90% urea-formaldehyde | 33.2 | 31.0 | 33.5 | 33.5 | 32.1 | 34.9 | 33.0 | 4.1 |
| 30% urea-formaldehyde-2 | 25.9 | 26.5 | — | — | — | — | 26.2 | — |
| 30% urea-formaldehyde-3 | 27.6 | 26.3 | — | — | — | — | 27.0 | — |

TABLE 3

Peak area of characteristic hydrolysis products chromatographic peak 2

| Sample | Measured peak area × $10^{-5}$ 1 | 2 | 3 | 4 | 5 | 6 | Average value | RSD (%) |
|---|---|---|---|---|---|---|---|---|
| melamine | N.D. | N.D. | — | — | — | — | N.D | — |
| 1% urea-formaldehyde | N.D. | N.D. | N.D. | N.D. | N.D. | N.D. | N.D | — |
| 2% urea-formaldehyde | N.D. | — | — | — | — | — | — | — |
| 5% urea-formaldehyde | N.D. | N.D. | N.D. | N.D. | N.D. | N.D. | N.D | — |
| 10% urea-formaldehyde | N.D. | — | — | — | — | — | — | — |
| 30% urea-formaldehyde | N.D. | N.D. | N.D. | N.D. | N.D. | N.D. | N.D | — |
| 50% urea-formaldehyde | 3.31 | — | — | — | — | — | — | — |
| 70% urea-formaldehyde | 23.0 | — | — | — | — | — | — | — |
| 90% urea-formaldehyde | 105 | 77.6 | 53.9 | 108 | 66.9 | 58.7 | 78.3 | 29.6 |

TABLE 3-continued

| Peak area of characteristic hydrolysis products chromatographic peak 2 | | | | | | | | |
|---|---|---|---|---|---|---|---|---|
| | Measured peak area × $10^{-5}$ | | | | | | Average | RSD |
| Sample | 1 | 2 | 3 | 4 | 5 | 6 | value | (%) |
| 30% urea-formaldehyde-2 | N.D. | N.D. | — | — | — | — | N.D | — |
| 30% urea-formaldehyde-3 | N.D. | N.D. | — | — | — | — | N.D | — |

TABLE 4

| Peak area of characteristic hydrolysis products chromatographic peak 3 | | | | | | | | |
|---|---|---|---|---|---|---|---|---|
| | Measured peak area × $10^{-5}$ | | | | | | Average | RSD |
| Sample | 1 | 2 | 3 | 4 | 5 | 6 | value | (%) |
| melamine | N.D. | N.D. | — | — | — | — | N.D | — |
| 1% urea-formaldehyde | N.D. | N.D. | N.D. | N.D. | N.D | N.D | N.D | — |
| 2% urea-formaldehyde | N.D. | — | — | — | — | — | — | — |
| 5% urea-formaldehyde | N.D. | N.D. | N.D. | N.D. | N.D. | N.D. | N.D | — |
| 10% urea-formaldehyde | N.D. | — | — | — | — | — | — | — |
| 30% urea-formaldehyde | 1.91 | 2.38 | 0.66 | 1.93 | 0.92 | 1.59 | 1.57 | 41.9 |
| 50% urea-formaldehyde | 3.96 | — | — | — | — | — | — | — |
| 70% urea-formaldehyde | 10.4 | — | — | — | — | — | — | — |
| 90% urea-formaldehyde | 50.5 | 51.6 | 56.9 | 41.9 | 60.0 | 64.7 | 54.3 | 14.8 |
| 30% urea-formaldehyde-2 | 0.88 | 2.52 | — | — | — | — | 1.70 | — |
| 30% urea-formaldehyde-3 | 2.68 | 2.25 | — | — | — | — | 2.46 | — |

TABLE 5

| Peak area of characteristic hydrolysis products chromatographic peak 4 | | | | | | | | |
|---|---|---|---|---|---|---|---|---|
| | Measured peak area × $10^{-5}$ | | | | | | Average | RSD |
| Sample | 1 | 2 | 3 | 4 | 5 | 6 | value | (%) |
| melamine | N.D. | N.D. | — | — | — | — | N.D | — |
| 1% urea-formaldehyde | N.D. | N.D. | N.D. | N.D. | N.D. | N.D. | N.D. | — |
| 2% urea-formaldehyde | N.D. | — | — | — | — | — | — | — |
| 5% urea-formaldehyde | N.D. | N.D. | N.D. | N.D. | N.D. | N.D. | N.D. | — |
| 10% urea-formaldehyde | N.D. | — | — | — | — | — | — | — |
| 30% urea-formaldehyde | 3.35 | 2.84 | 1.16 | 2.56 | 1.34 | 2.11 | 2.23 | 38.6 |
| 50% urea-formaldehyde | 9.04 | — | — | — | — | — | — | — |
| 70% urea-formaldehyde | 27.1 | — | — | — | — | — | — | — |
| 90% urea-formaldehyde | 51.1 | 49.3 | 51.7 | 52.8 | 58.4 | 54.8 | 53.0 | 6.0 |
| 30% urea-formaldehyde-2 | 3.24 | 4.33 | — | — | — | — | 3.78 | — |
| 30% urea-formaldehyde-3 | 5.30 | 4.71 | — | — | — | — | 5.00 | — |

TABLE 6

| Peak area of characteristic hydrolysis products chromatographic peak 5 | | | | | | | | |
|---|---|---|---|---|---|---|---|---|
| | Measured peak area × $10^{-5}$ | | | | | | Average | RSD |
| Sample | 1 | 2 | 3 | 4 | 5 | 6 | value | (%) |
| melamine | N.D. | N.D. | — | — | — | — | N.D | — |
| 1% urea-formaldehyde | N.D. | N.D. | N.D. | N.D. | N.D. | N.D. | N.D. | — |
| 2% urea-formaldehyde | 0.56 | — | — | — | — | — | — | — |
| 5% urea-formaldehyde | 2.00 | 1.51 | 2.27 | 2.22 | 1.86 | 1.67 | 1.92 | 15.6 |
| 10% urea-formaldehyde | 4.74 | — | — | — | — | — | — | — |
| 30% urea-formaldehyde | 16.7 | 15.6 | 15.2 | 24.5 | 16.4 | 17.3 | 17.6 | 19.6 |
| 50% urea-formaldehyde | 31.6 | — | — | — | — | — | — | — |
| 70% urea-formaldehyde | 29.9 | — | — | — | — | — | — | — |
| 90% urea-formaldehyde | 18.9 | 19.3 | 19.1 | 21.7 | 23.8 | 20.9 | 20.6 | 9.3 |
| 30% urea-formaldehyde-2 | 23.6 | 21.1 | — | — | — | — | 22.4 | — |
| 30% urea-formaldehyde-3 | 24.0 | 23.0 | — | — | — | — | 23.5 | — |

TABLE 7

| Peak area of characteristic hydrolysis products chromatographic peak 6 | | | | | | | | |
|---|---|---|---|---|---|---|---|---|
| | Measured peak area × $10^{-5}$ | | | | | | Average | RSD |
| Sample | 1 | 2 | 3 | 4 | 5 | 6 | value | (%) |
| melamine | N.D. | N.D. | — | — | — | — | N.D | — |
| 1% urea-formaldehyde | N.D. | — | — | — | — | — | — | — |
| 2% urea-formaldehyde | N.D. | N.D. | N.D. | N.D. | N.D. | N.D. | N.D. | — |
| 5% urea-formaldehyde | 0.24 | 0.36 | 0.27 | 0.50 | 0.55 | 0.37 | 0.38 | 32 |
| 10% urea-formaldehyde | 2.35 | — | — | — | — | — | — | — |
| 30% urea-formaldehyde | 11.7 | 11.0 | 10.2 | 11.0 | 10.1 | 10.9 | 10.8 | 5.7 |
| 50% urea-formaldehyde | 16.7 | — | — | — | — | — | — | — |
| 70% urea-formaldehyde | 23.5 | — | — | — | — | — | — | — |
| 90% urea-formaldehyde | 32.6 | 32.1 | 32.8 | 30.5 | 34.5 | 34.3 | 32.8 | 4.5 |
| 30% urea-formaldehyde-2 | 11.4 | 10.8 | — | — | — | — | 11.2 | — |
| 30% urea-formaldehyde-3 | 12.9 | 12.6 | — | — | — | — | 12.8 | — |

TABLE 8

| Peak area of characteristic hydrolysis products chromatographic peak 7 | | | | | | | | |
|---|---|---|---|---|---|---|---|---|
| | Measured peak area × $10^{-5}$ | | | | | | Average | RSD |
| Sample | 1 | 2 | 3 | 4 | 5 | 6 | value | (%) |
| melamine | N.D. | N.D. | — | — | — | — | N.D | — |
| 1% urea-formaldehyde | N.D. | N.D. | N.D. | N.D. | N.D. | N.D. | N.D. | — |
| 2% urea-formaldehyde | N.D. | — | — | — | — | — | — | — |
| 5% urea-formaldehyde | N.D. | N.D. | N.D. | N.D. | N.D. | N.D. | N.D. | — |
| 10% urea-formaldehyde | N.D. | — | — | — | — | — | — | — |

TABLE 8-continued

Peak area of characteristic hydrolysis products chromatographic peak 7

| Sample | Measured peak area × $10^{-5}$ 1 | 2 | 3 | 4 | 5 | 6 | Average value | RSD (%) |
|---|---|---|---|---|---|---|---|---|
| 30% urea-formaldehyde | 0.93 | 0.84 | 0.49 | 1.62 | 0.60 | 0.81 | 0.88 | 44.9 |
| 50% urea-formaldehyde | 5.35 | — | — | — | — | — | — | — |
| 70% urea-formaldehyde | 10.6 | — | — | — | — | — | — | — |
| 90% urea-formaldehyde | 13.4 | 13.5 | 14.3 | 14.2 | 14.8 | 15.4 | 1.43 | 5.5 |
| 30% urea-formaldehyde-2 | 1.58 | 1.50 | — | — | — | — | 1.54 | — |
| 30% urea-formaldehyde-3 | 1.81 | 1.91 | — | — | — | — | 1.86 | — |

TABLE 9

Peak area of characteristic hydrolysis products chromatographic peak 8

| Sample | Measured peak area × $10^{-5}$ 1 | 2 | 3 | 4 | 5 | 6 | Average value | RSD (%) |
|---|---|---|---|---|---|---|---|---|
| melamine | N.D. | N.D. | — | — | — | — | N.D | — |
| 1% urea-formaldehyde | N.D. | N.D. | N.D. | N.D. | N.D. | N.D. | N.D. | — |
| 2% urea-formaldehyde | N.D. | — | — | — | — | — | — | — |
| 5% urea-formaldehyde | N.D. | N.D. | N.D. | N.D. | N.D. | N.D. | N.D. | — |
| 10% urea-formaldehyde | N.D. | — | — | — | — | — | — | — |
| 30% urea-formaldehyde | 1.14 | 1.07 | 0.65 | 1.19 | 0.67 | 1.13 | 0.98 | 25.1 |
| 50% urea-formaldehyde | 3.87 | — | — | — | — | — | — | — |
| 70% urea-formaldehyde | 6.17 | — | — | — | — | — | — | — |
| 90% urea-formaldehyde | 9.01 | 5.01 | 5.02 | 7.24 | 4.01 | 3.81 | 5.68 | 35.8 |
| 30% urea-formaldehyde-2 | 0.63 | 0.72 | — | — | — | — | 0.68 | — |
| 30% urea-formaldehyde-3 | 1.59 | 1.52 | — | — | — | — | 1.56 | — |

TABLE 10

Peak area of characteristic hydrolysis products chromatographic peak 9

| Sample | Measured peak area × $10^{-5}$ 1 | 2 | 3 | 4 | 5 | 6 | Average value | RSD (%) |
|---|---|---|---|---|---|---|---|---|
| melamine | N.D. | N.D. | — | — | — | — | N.D | — |
| 1% urea-formaldehyde | N.D. | N.D. | N.D. | N.D. | N.D. | N.D. | N.D. | — |
| 2% urea-formaldehyde | N.D. | — | — | — | — | — | — | — |
| 5% urea-formaldehyde | N.D. | N.D. | N.D. | N.D. | N.D. | N.D. | N.D. | — |
| 10% urea-formaldehyde | N.D. | — | — | — | — | — | — | — |
| 30% urea-formaldehyde | 8.53 | 8.43 | 6.10 | 10.7 | 6.24 | 7.02 | 7.84 | 22.2 |
| 50% urea-formaldehyde | 18.7 | — | — | — | — | — | — | — |
| 70% urea-formaldehyde | 20.9 | — | — | — | — | — | — | — |
| 90% urea-formaldehyde | 12.2 | 11.7 | 12.1 | 13.9 | 13.7 | 12.2 | 12.6 | 7.2 |

TABLE 10-continued

| Peak area of characteristic hydrolysis products chromatographic peak 9 | | | | | | | | |
|---|---|---|---|---|---|---|---|---|
| | Measured peak area × $10^{-5}$ | | | | | | Average | RSD |
| Sample | 1 | 2 | 3 | 4 | 5 | 6 | value | (%) |
| 30% urea-formaldehyde-2 | 9.54 | 9.20 | — | — | — | — | 9.37 | — |
| 30% urea-formaldehyde-3 | 11.4 | 11.4 | — | — | — | — | 11.4 | — |

TABLE 11

| Peak area of characteristic hydrolysis products chromatographic peak 10 | | | | | | | | |
|---|---|---|---|---|---|---|---|---|
| | Measured peak area × $10^{-5}$ | | | | | | Average | RSD |
| Sample | 1 | 2 | 3 | 4 | 5 | 6 | value | (%) |
| melamine | N.D. | N.D. | — | — | — | — | N.D | — |
| 1% urea-formaldehyde | N.D. | N.D. | N.D. | N.D. | N.D. | N.D. | N.D. | — |
| 2% urea-formaldehyde | 0.47 | — | — | — | — | — | — | — |
| 5% urea-formaldehyde | 1.69 | 1.44 | 1.62 | 1.64 | 1.83 | 1.40 | 1.60 | 10.1 |
| 10% urea-formaldehyde | 5.28 | — | — | — | — | — | — | — |
| 30% urea-formaldehyde | 14.8 | 15.0 | 14.1 | 24.0 | 14.8 | 16.2 | 16.5 | 23.5 |
| 50% urea-formaldehyde | 30.0 | — | — | — | — | — | — | — |
| 70% urea-formaldehyde | 27.1 | — | — | — | — | — | — | — |
| 90% urea-formaldehyde | 16.5 | 16.2 | 17.2 | 18.8 | 20.1 | 18.0 | 17.8 | 8.2 |
| 30% urea-formaldehyde-2 | 23.4 | 23.6 | — | — | — | — | 23.5 | — |
| 30% urea-formaldehyde-3 | 25.4 | 25.2 | — | — | — | — | 25.3 | — |

TABLE 12

| Peak area of characteristic hydrolysis products chromatographic peak 11 | | | | | | | | |
|---|---|---|---|---|---|---|---|---|
| | Measured peak area × $10^{-5}$ | | | | | | Average | RSD |
| Sample | 1 | 2 | 3 | 4 | 5 | 6 | value | (%) |
| melamine | N.D. | N.D. | — | — | — | — | N.D | — |
| 1% urea-formaldehyde | N.D. | N.D. | N.D. | N.D. | N.D. | N.D. | N.D. | — |
| 2% urea-formaldehyde | N.D. | — | — | — | — | — | — | — |
| 5% urea-formaldehyde | N.D. | N.D. | N.D. | N.D. | N.D. | N.D. | N.D. | — |
| 10% urea-formaldehyde | N.D. | — | — | — | — | — | — | — |
| 30% urea-formaldehyde | 0.27 | 0.22 | 0.19 | 0.24 | 0.14 | 0.36 | 0.23 | 32.2 |
| 50% urea-formaldehyde | 1.33 | — | — | — | — | — | — | — |
| 70% urea-formaldehyde | 4.44 | — | — | — | — | — | — | — |
| 90% urea-formaldehyde | 6.99 | 3.11 | 3.25 | 6.46 | 2.63 | 2.47 | 4.15 | 48.6 |
| 30% urea-formaldehyde-2 | 0.12 | 0.16 | — | — | — | — | 0.14 | — |
| 30% urea-formaldehyde-3 | 0.36 | 0.33 | — | — | — | — | 0.34 | — |

From the results of Table 2 to Table 12, it can be seen that by using the method of the present disclosure the detection limit of urea could reach 1%, and 2% for chromatographic peaks 5 and 10, 5% for chromatographic peak 6, 30% for chromatographic peaks 3, 4, 7, 8, 9, 11, and 50% for chromatographic peak 2. The stability of the method (relative standard deviation) was between 4.1% and 44.9%. The detected components were reproducible in multiple tests.

Experimental Example 1 Effect of Preparation Method of Test Sample Solutions on Test Results 1. Hydrolysis Temperature and Time The sample to be tested was processed into powder with a tool and mixed well. Weighed 0.06 g of the sample and placed it into a 2 mL plastic centrifuge tube, washed the powder three times with 4.5 mL of 0.12 mol/L hydrochloric acid solution, and discarded the washing solution. Completely transferred the powder into a 25 mL polytetrafluoroethylene inner tank of hydrothermal reactor kettle with 4.5 mL of 0.12 mol/L hydrochloric acid solution and sealed the tank. Placed the hydrothermal reaction kettle under the following 5 conditions for treatment—① 110° C., 1 hour; ② 120° C., 1 hour; ③ 110° C., 1.5 hours; ④ 110° C., 2.5 hours; ⑤ 110° C., 3.5 hours.

After the treatment, took out the reaction kettle, cooled to room temperature, opened the tank, completely transferred the powder and liquid in the tank into a 10 mL colorimetric tube, washed the inner wall of the tank with water, and transferred the washing solution to the same colorimetric tube; diluted with water to the mark, and vortex mixed well. Took approximately 1 mL of the solution and passed it through the polyethersulfone filter membrane to obtain the test solution.

Using high-performance liquid chromatography ultraviolet detector to detect the response of urea chromatographic peak in the hydrolysate of urea-formaldehyde samples to obtain the hydrolysis condition with the highest urea chromatographic peak response as the final sample hydrolysis conditions. The peak areas under five conditions were: ① 32.6 mAu*s; ② 30.2 mAu*s; ③ 24.1 mAu*s; ④ 23.2 mAu*s; ⑤ 19.4 mAu*s. Therefore, 110° C. and 1 hour were used as the hydrolysis conditions in the preparation of the test solution.

2. Quality of the Sample to be Tested

After comparing the responses of urea chromatographic peaks in the hydrolysates of 0.06 g, 0.12 g, and 0.18 g of melamine samples mixed with 1% (wt/wt) urea-formaldehyde resin, the responses of urea chromatographic peaks in the hydrolysates of the three samples were slightly different, and the peak areas were respectively 6.8 E5 cps*s, 6.4 E5 cps*s, and 7.4 E5 cps*s. In order to reduce the content of dissolved substances in the test solutions and improve the stability of the method, 0.06 g was selected as the mass of the sample prepared from the test solution Experimental Example 2 Effect of Mass Spectrometry Conditions on Detection Results In order to improve the peak area of urea mass spectrometry, the following mass spectrometry ion source parameters were optimized by single factor comparison (10 mg/L of urea standard solution was used as the solution to be tested). Other detection conditions were the same as in Example 1.

1. Temperature

550° C., 650° C., and 700° C. were compared, the peak areas were 1.9 E5 cps*s, 2.3 E5 cps*s, and 2.3 E5 cps*s, respectively.

2. GAS1

55 psi, 60 psi, 65 psi, 70 psi were compared, the peak areas were 2.0 E5 cps*s, 2.2 E5 cps*s, 1.8 E5 cps*s, and 1.6 E5 cps*s, respectively.

3. GAS2

55 psi, 60 psi, 65 psi, 70 psi were compared, the peak areas were 2.0 E5 cps*s, 2.2 E5 cps*s, 2.2 E5 cps*s, and 2.1 E5 cps*s, respectively.

4. Curtain Gas 35 psi, 40 psi, 45 psi were compared, the peak areas were 2.1 E5 cps*s, 2.1 E5 cps*s, and 2.1 E5 cps*s, respectively.

Finally, the mass spectrometry ion source conditions of the present disclosure were selected: Temperature 650° C., GAS1 60 psi, GAS2 60 psi, and Curtain gas 40 psi.

Experimental Example 3 Effect of Chromatographic Conditions on Detection Results The commonly used reverse phase liquid chromatography columns do not retain polar compounds such as urea, so they are not suitable for the application of this method. Using an amino column and 5 mmol/L of ammonium acetate as the aqueous mobile phase is beneficial to improving both the chromatographic peak shape of compound and the stability of the method.

After optimizing the mobile phase gradient, urea had better retention (1.5 minutes of retention time), and had better separation from the main hydrolysis product of melamine resin, melamine (2.5 minutes of retention time), avoiding the interference of melamine in the determination.

Experimental Example 4 Effect of Identification Standards on Test Results

In addition to urea, more than thirty different components (chromatographic peaks) could be extracted from the hydrolysate of urea-formaldehyde products, which were different from the hydrolysate of melamine products. In addition to the chromatographic peaks selected in the present disclosure, there were also chromatographic peaks of the following mass spectrometry molecular weights such as 445.201 (3.0 min, RSD 45.9%), 289.137 (3.8 min), 529.238 (2.3 min, RSD 123.2%), 467.187 (3.8 min), 341.131 (3.5 min, RSD 55.2%), 353.112 (2.7 min, RSD 48.2%) 311.108 (3.7 min), 407.154 (2.6 min, RSD of 120.5%), etc.

After comparing the component response and examining the stability of the method, 11 components (including urea, Table 1) were selected as the target components for identifying melamine products mixed with urea-formaldehyde resin.

The technical features of the examples above can be combined arbitrarily. To simplify description, all possible combinations of the technical features of the examples above are not described. However, as long as there is no contradiction in the combination of these technical features, they should be considered to be the scope recorded in the description.

The examples above express several implementations of the present disclosure only. The description of the examples is relatively specific and detailed, but may not therefore be construed as the limitation to the patent scope of the present disclosure. It should be noted that a person of ordinary skill in the art may further make several variations and improvements without departing from the concept of the present disclosure. These variations and improvements all fall within the protection scope of the present disclosure. Therefore, the patent protection scope of the present disclosure shall be defined by the appended claims.

What is claimed is:

1. A method for detecting urea-formaldehyde resin in melamine-formaldehyde materials, including the following steps:

washing melamine-formaldehyde material powder to be tested with a hydrochloric acid solution;

placing the melamine-formaldehyde material powder at 105° C. to 115° C. for hydrolysis for 55 min to 65 min to obtain a hydrolysis product;

passing the hydrolysis product through a polyethersulfone filter membrane to obtain a test solution;

detecting the test solution through high-performance liquid chromatography-mass spectrometry; and detecting chromatographic peaks, when one or more of the following chromatographic peaks 1 to 11 appear in the test solution, there is urea-formaldehyde resin in the test solution:

chromatographic peak 1: mass spectrometry molecular weight 61.040±0.02 Da, retention time 1.0 min to 2.0 min;

chromatographic peak 2: mass spectrometry molecular weight 613.266=0.02 Da, retention time 0.8 min to 7.5 min;

chromatographic peak 3: mass spectrometry molecular weight 479.183±0.02 Da, retention time 2.0 min to 8.0 min;

chromatographic peak 4: mass spectrometry molecular weight 331.147±0.02 Da, retention time 1.5 min to 6.0 min;

chromatographic peak 5: mass spectrometry molecular weight 155.054±0.02 Da, retention time 1.5 min to 4.0 min;

chromatographic peak 6: mass spectrometry molecular weight 145.072±0.02 Da, retention time 1.0 min to 6.5 min;

chromatographic peak 7: mass spectrometry molecular weight 217.104±0.02 Da, retention time 1.0 min to 6.5 min;

chromatographic peak 8: mass spectrometry molecular weight 299.119±0.02 Da, retention time 1.5 min to 6.5 min;

chromatographic peak 9: mass spectrometry molecular weight 329.129±0.02 Da, retention time 1.5 min to 6.0 min;

chromatographic peak 10: mass spectrometry molecular weight 185.065±0.02 Da, retention time 1.0 min to 4.0 min; and chromatographic peak 11: mass spectrometry molecular weight 371.153±0.02 Da, retention time 1.5 min to 7.0 min;

wherein liquid chromatography conditions include: a chromatographic column being an amino column; a mobile phase A is a ammonium acetate aqueous solution with a mass concentration of 0.36 g/L to 0.40 g/L, and a mobile phase B is acetonitrile; a gradient elution procedure selected from the group consisting of 0 min, 10±2% A; 1.0 min, 10=2% A; 6.0 min, 30±5% A; 10.0 min, 30±5% A; 11.0 min, 10±2% A; and 15.5 min, 10±2% A; an injection volume of 2±1 μL; and a flow rate of 0.4±0.1 mL/min, wherein mass spectrometry conditions include: GAS 1 of 60±2 psi; GAS 2 of 60±2 psi; curtain gas of 40±2 psi; a temperature of 650° C.±20° C.; Collisionally Activated Dissociation (CAD) GAS of 7±1; spray voltage of 3500±50 V; Time-of-Flight Mass Spectrometry (TOF MS) start mass of 50±5 Da; TOF MS stop mass of 1000±50 Da; TOF MS accumulation time of 0.3±0.05 s; Time-of-Flight Mass Spectrometry Declustering Potential (TOF MS DP) of 60±5 V; TOF MS DP spread of 0 V; Time-of-Flight Collision Energy (TOF CE) of 10±1 V; TOF CE spread of 0 V; Time-of-Flight Tandem Mass Spectrometry (TOF MSMS) start mass of 50±5 Da; TOF MSMS stop mass of 1000±50 Da; TOF MSMS accumulation time of 0.1±0.01 s; Time-of-Flight Tandem Mass Spectrometry Declustering Potential (TOF MSMS DP) of 60±5 V; TOF MSMS DP spread of 0 V; Time-of-Flight Tandem Mass Spectrometry Collision Energy (TOF MSMS CE) of 20=2 V; and TOF MSMS CE spread of 0 V.

2. The method for detecting urea-formaldehyde resin in melamine-formaldehyde materials according to claim 1, wherein the gradient elution procedure is selected from the group consisting of 0 min, 10% A; 1.0 min, 10% A; 6.0 min, 30% A; 10.0 min, 30% A; 11.0 min, 10% A; and 15.5 min, 10% A.

3. The method for detecting urea-formaldehyde resin in melamine-formaldehyde materials according to claim 1, wherein the mass spectrometry conditions include: the GAS 1 of 60 psi; the GAS 2 of 60 psi; the curtain gas of 40 psi; and the temperature of 650° C.

4. The method for detecting urea-formaldehyde resin in melamine-formaldehyde materials according to claim 1, wherein a temperature of the hydrolysis is 110° C.±2° C., and a time of the hydrolysis is 60 min=2 min.

5. The method for detecting urea-formaldehyde resin in melamine-formaldehyde materials according to claim 1, wherein a concentration of the hydrochloric acid solution ranges from 0.10 mol/L to 0.15 mol/L.

* * * * *